United States Patent
Rico Alvarino et al.

(10) Patent No.: US 12,035,334 B2
(45) Date of Patent: Jul. 9, 2024

(54) INTERACTION OF MULTICAST BAND WIDTH PART (BWP) WITH MULTIPLE BWP

(71) Applicant: QUALCOMM Incorporated, San Diego, CA (US)

(72) Inventors: Alberto Rico Alvarino, San Diego, CA (US); Kazuki Takeda, Tokyo (JP); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/393,427

(22) Filed: Aug. 4, 2021

(65) Prior Publication Data

US 2022/0046587 A1   Feb. 10, 2022

Related U.S. Application Data

(60) Provisional application No. 63/062,453, filed on Aug. 7, 2020.

(51) Int. Cl.
*H04W 72/30* (2023.01)
*H04L 1/1867* (2023.01)
(Continued)

(52) U.S. Cl.
CPC .......... *H04W 72/30* (2023.01); *H04L 1/1896* (2013.01); *H04W 72/0453* (2013.01); *H04W 72/1263* (2013.01)

(58) Field of Classification Search
CPC ............. H04W 72/30; H04W 72/0453; H04W 72/1263; H04W 72/23; H04L 1/1896; H04L 2001/0093
See application file for complete search history.

(56) References Cited

U.S. PATENT DOCUMENTS

2017/0094569 A1* 3/2017 Urabayashi ....... H04W 36/0069
2018/0270893 A1* 9/2018 Patel ..................... H04W 72/21
(Continued)

FOREIGN PATENT DOCUMENTS

EP   3817485 A1   5/2021
WO   2020029997 A1   2/2020

OTHER PUBLICATIONS

Huawei., et al., "Bandwidth Parts and Resource Pools for V2X Sidelink", 3GPP TSG RAN WG1 Meeting #95, Spokane, USA, Nov. 12-16, 2018, R1-1813555, (Year: 2018), 12 pages, XP051555610, Retrieved from the Internet: URL: http://www.3gpp.org/ftp/Meetings%5F3GPP%5FSYNC/RAN1/Docs/R1%2D1813555%2Ezip. [Retrieved on Nov. 11, 2018], p. 6. Paragraph 2.2-p. 8. Paragraph 2.4 Section 4, p. 9-p. 11 Figures 2-6.

(Continued)

Primary Examiner — Yu-Wen Chang
(74) Attorney, Agent, or Firm — QUALCOMM Incorporated

(57) ABSTRACT

Embodiments include systems, methods, and devices for radio resource allocation to support multicast services in a network, such as a Fifth Generation (5G) New Radio (NR) (5G NR), etc. In some embodiments, the methods may be performed by a processor of the base station. In some embodiments, the methods may be performed by a processor of a wireless device. Various embodiments may include configuring two or more downlink (DL) frequency resources for multicast communication within a carrier bandwidth. Various embodiments may include selecting a DL frequency resource for multicast communication of the two or more DL frequency resources for multicast communication to monitor for transmission of multicast data from a base station based at least in part on an active DL bandwidth part (BWP) of a wireless device.

25 Claims, 19 Drawing Sheets

(51) Int. Cl.
 *H04W 72/0453* (2023.01)
 *H04W 72/1263* (2023.01)

(56) References Cited

U.S. PATENT DOCUMENTS

| | | | | |
|---|---|---|---|---|
| 2018/0279135 | A1* | 9/2018 | Hwang | H04W 72/23 |
| 2019/0028854 | A1* | 1/2019 | Hua | H04W 72/30 |
| 2020/0267511 | A1* | 8/2020 | Abdoli | H04W 72/30 |
| 2021/0051582 | A1* | 2/2021 | Shrivastava | H04W 4/06 |
| 2021/0127359 | A1* | 4/2021 | Takeda | H04L 5/0092 |
| 2021/0337544 | A1* | 10/2021 | Wang | H04W 4/06 |
| 2021/0392467 | A1* | 12/2021 | Kim | H04W 52/0219 |
| 2021/0410129 | A1* | 12/2021 | Freda | H04W 72/543 |
| 2022/0046588 | A1* | 2/2022 | Yeo | H04W 4/06 |
| 2022/0141856 | A1* | 5/2022 | Xia | H04L 5/1423 370/329 |
| 2022/0322400 | A1* | 10/2022 | Hu | H04W 72/1273 |
| 2022/0338202 | A1* | 10/2022 | Kim | H04W 8/00 |
| 2022/0360951 | A1* | 11/2022 | Yu | H04L 1/1854 |
| 2022/0407646 | A1* | 12/2022 | Yoshioka | H04W 52/34 |

OTHER PUBLICATIONS

Huawei, et al., "BWP Operation for V2X Sidelink", 3GPP Draft, 3GPP TSG RAN WG1 Ad-Hoc Meeting 1901, R1-1900859, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593705, 5 Pages, Retrieved from the Internet: URL: http://www.3gpp.org/ftp/Meetings%5F3GPP%5FSYNC/RAN1/Docs/R1%2D1900859%2Ezip. [Retrieved on Jan. 20, 2019], Paragraph [0002].

Huawei, et al., "HARQ Enhancements in NR Unlicensed", 3GPP Draft, 3GPP TSG RAN WG1 Meeting #94bis, R1-1810128, 3rd Generation Partnership Project (3GPP), Mobile Competence Centre, 650, Route Des Lucioles, F-06921 Sophia-Antipolis Cedex, France, Oct. 12, 2018 (Oct. 12, 2018), pp. 1-10, XP051517543, Retrieved from the Internet: URL: http://www.3gpp.org/ftp/tsg%5Fran/WG1%5FRL1/TSGR1%5F94b/Docs/R1%2D1810128%2Ezip. [Retrieved on Oct. 12, 2018] paragraph [03.2].

Huawei, et al., "BWP Operation for V2X Sidelink," 3GPP Draft, 3GPP TSG RAN WG1 Meeting #96bis, R1-1904690, 3rd Generation Partnership Project (3GPP), Mobile Competence Centre, 650, Route Des Lucioles, F-06921, Sophia-Antipolis Cedex, France, vol. RAN WG1, No. Xi 'an, China; Apr. 8, 2019-Apr. 12, 2019, Apr. 2, 2019 (Apr. 2, 2019), XP051707283, 6 pages, Retrieved from the Internet: URL: http://www.3gpp.org/ftp/tsg%5Fran/WG1%5FRL1/TSGR1%5F96b/Docs/R1%2D1904690%2Ezip [retrieved on Apr. 2, 2019] the whole document.

Huawei., et al., "Discussion on NPDCCH Search Space for Multicast in NB-IoT," 3GPP Draft, 3GPP TSG RAN WG1 Meeting #86bis, R1-1608614, 3rd Generation Partnership Project (3GPP), Mobile Competence Centre, 650, Route Des Lucioles, F-06921, Sophia-Antipolis Cedex, France, vol. RAN WG1. No. Lisbon. Portugal, Oct. 10, 2016-Oct. 14, 2016, Oct. 9, 2016 (Oct. 9, 2016), XP051148673, 5 pages, Retrieved from the Internet: URL: http://www.3gpp.org/ftp/Meetings_3GPP_SYNC/RAN1/Docs/ [retrieved on Oct. 9, 2016] p. 1. paragraph 2 p. 1; figure 1.

International Search Report and Written Opinion—PCT/US2021/044771—ISA/EPO—Dec. 3, 2021, 18 pages.

* cited by examiner

INTERACTION OF MULTICAST BAND WIDTH PART (BWP) WITH MULTIPLE BWP

RELATED APPLICATIONS

This application claims the benefit of priority to U.S. Provisional Application No. 63/062,453 entitled "Interaction Of Multicast BWP With Multiple BWP" filed Aug. 7, 2020, the entire contents of which are hereby incorporated herein by reference for all purposes.

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include systems, methods, and devices for radio resource allocation to support multicast services, such as multicast services in a Fifth Generation (5G) New Radio (NR)(5G NR) network. In some aspects, the methods may be performed by a processor of a base station. In some aspects, the methods may be performed by a processor of a wireless device.

Various aspects may include receiving an indication of two or more downlink (DL) frequency resources for multicast communication from a base station, selecting a DL frequency resource for multicast communication of the two or more DL frequency resources for multicast communication from the base station to monitor for transmission of multicast data from the base station based at least in part on an active DL bandwidth part (BWP), and monitoring the selected DL frequency resource for multicast communication for transmission of multicast data from the base station.

In some aspects, the indication of the two or more DL frequency resources for multicast communication indicates a one-to-one mapping between each of the two or more DL frequency resources for multicast communication and a respective DL BWP configured within a carrier bandwidth.

In some aspects, wherein selecting the DL frequency resource for multicast communication of the two or more DL frequency resources for multicast communication from the base station to monitor for transmission of multicast data from the base station based at least in part on the active DL BWP may include determining the active DL BWP, determining a numerology of the active DL BWP, and selecting the DL frequency resource for multicast communication of the two or more DL frequency resources for multicast communication from the base station to monitor for transmission of multicast data from the base station that is fully contained within the active DL BWP and/or has a same numerology as the active DL BWP.

In some aspects, receiving the indication of the two or more DL frequency resources for multicast communication from the base station may include receiving the indication of the two or more DL frequency resources for multicast communication from the base station in a unicast radio resource control (RRC) message.

In some aspects, the two or more DL frequency resources for multicast communication from the base station may include at least a first DL frequency resource for multicast communication from the base station associated with a multicast control channel, and at least a second DL frequency resource for multicast communication from the base station associated with a multicast traffic channel.

Various aspects may further include determining a feedback configuration for the active DL BWP, and sending multicast feedback data to the base station according to the feedback configuration for the active DL BWP.

Various aspects may further include receiving an indication of two or more uplink (UL) frequency resources for multicast communication, and sending multicast feedback data to the base station using at least one of the two or more UL frequency resources for multicast communication.

In some aspects, one of the two or more UL frequency resources for multicast is selected for use in sending the multicast feedback data to the base station based at least in part on the active DL BWP.

In some aspects, the two or more DL frequency resources for multicast communication may include a plurality of sets of two or more DL frequency resources for multicast communication and each of the plurality of sets is associated with a different service.

In some aspects, selecting the DL frequency resource for multicast communication of the two or more DL frequency resources for multicast communication from the base station to monitor for transmission of multicast data from the base station based at least in part on the active DL BWP may include selecting the DL frequency resource for multicast communication of the two or more DL frequency resources for multicast communication from the base station to monitor for transmission of multicast data from the base station based at least in part on the active DL BWP and a selection of one of the different services.

In some aspects, each of the two or more DL frequency resources for multicast communication have different configurations and the different configurations are different search space sets or different physical channel configurations.

Various aspects may include configuring two or more downlink (DL) frequency resources for multicast communication within a carrier bandwidth, sending an indication of the two or more DL frequency resources for multicast communication to one or more wireless devices in communication with the base station, and scheduling transmission of multicast data in at least one of the two or more DL frequency resources for multicast communication.

In some aspects, configuring the two or more DL frequency resources for multicast communication within the carrier bandwidth may include determining two or more DL band width parts (BWPs) configured within the carrier bandwidth, and configuring a DL frequency resource for multicast communication for each of the two or more DL BWPs configured within the carrier bandwidth.

In some aspects, sending the indication of the two or more DL frequency resources for multicast communication to the one or more wireless devices in communication with the base station may include sending the indication of the two or more DL frequency resources for multicast communication to the one or more wireless devices in communication with the base station in a radio resource control (RRC) message.

Various aspects may further include configuring an uplink (UL) frequency resource for multicast communication for each of the two or more DL frequency resources for multicast communication, sending an indication of the UL frequency resources for multicast communication to the one or more wireless devices in communication with the base station, and receiving multicast feedback data from at least one of the one or more wireless devices in the UL frequency resources for multicast communication.

In some aspects, the two or more DL frequency resources for multicast communication are two or more control resource sets (CORESETs) for multicast communication.

In some aspects, each of the two or more DL frequency resources for multicast communication have different configurations and the different physical channel configurations are different search space sets or different physical channel configurations.

In some aspects, configuring the two or more DL frequency resources for multicast communication within the carrier bandwidth may include determining two or more DL band width parts (BWPs) configured within the carrier bandwidth, and configuring a DL frequency resource for multicast communication for each of the two or more DL BWPs configured within the carrier bandwidth such that there is a one-to-one mapping between each DL frequency resource for multicast communication and each of the two or more DL BWPs configured within the carrier bandwidth.

Further aspects may include a wireless device having a processor configured to perform operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform operations of any of the methods summarized above. Further aspects include a system in a package that includes two systems on chip for use in a wireless device that includes a processor configured to perform operations of any of the methods summarized above. Further aspects may include a network computing device having a processor configured to perform operations of any of the methods summarized above. Further aspects may include a non-transitory processor-readable storage medium having stored thereon processor-executable instructions configured to cause a processor of a network computing device to perform operations of any of the methods summarized above. Further aspects include a network computing device having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
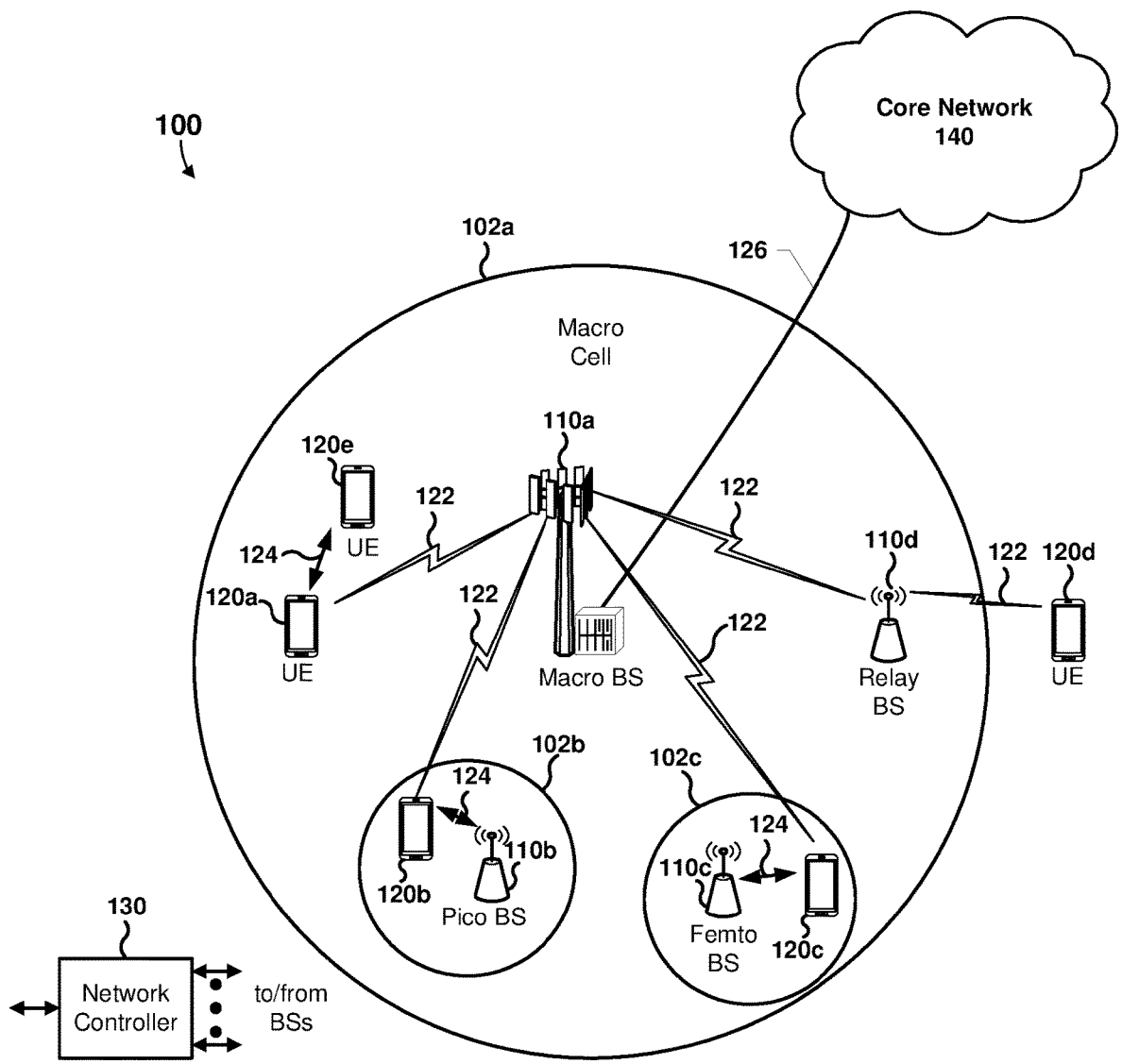
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide base station and wireless device implemented methods for radio resource allocation to support multicast services from a network, such as a Fifth Generation (5G) New Radio (NR)(5G NR) network. Various embodiments may include configuring two or more downlink (DL) frequency resources for multicast communication within a carrier bandwidth. Various embodiments may include selecting a DL frequency resource for multicast communication of the two or more DL frequency resources for multicast communication to monitor for transmission of multicast data based at least in part on an active DL bandwidth part (BWP) of a wireless device. By enabling the configuration and selection among multiple DL frequency resources for multicast communication, the various embodiments may enable increased multicast service delivery to wireless devices in network, such as a 5G NR network.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, entertainment devices (e.g., wireless gaming controllers, music and video players, satellite radios, etc.), wireless communication elements within autonomous and semiautonomous vehicles, wireless devices affixed to or incorporated into various mobile platforms, and similar electronic devices that include a memory, multiple SIMs, wireless communication components and a programmable processor.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "SIM," "SIM card," and "subscriber identity module" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP standard. Universal Integrated Circuit Card (UICC) is another term for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "multi-SIM wireless device", "MS wireless device", "dual-SIM wireless device", and "DS wireless device" may interchangeably describe a wireless device that is configured with more than one SIM. Examples of multi-SIM wireless devices include multi-SIM multi-standby (MSMS) wireless devices, such as Dual-SIM (DS) dual-standby (DSDS) wireless devices, etc., and multi-SIM multi-active (MSMA) wireless devices, such as Dual-SIM dual-active (DSDA wireless devices, etc. An MSMS wireless device may be a wireless device that is configured with more than one SIM and allows idle-mode operations to be performed on two subscriptions simultaneously, as well as selective communication on one subscription while performing idle-mode operations on at least one other subscription. An MSMA wireless device may be a wireless device that is configured with more than one SIM and allows idle-mode and/or active mode operations to be performed on two subscriptions simultaneously using at least two different radio frequency (RF) resources (e.g., two different wireless transceivers).

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

As used herein, the term "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain."

As used herein, the term "frequency resource for multicast communication" generally refers to a defined set of physical resource blocks associated with multicast service delivery to a wireless device and/or reporting on multicast service reception by a wireless device. Frequency resources for multicast communication may include downlink (DL) frequency resources for multicast communication and/or uplink (UL) frequency resources for multicast communication. As used herein, the term "DL frequency resource for multicast communication" generally refers to a defined set of one or more physical resource blocks in which a wireless device may monitor a physical downlink control channel (PDCCH) for multicast information and/or in which a wireless device may receive multicast information. Examples of DL frequency resources for multicast communication include bandwidth parts (BWPs), such as multicast BWPs, control resource sets (CORESETs), etc. Various examples are described herein with reference to BWPs; however, references to BWPs are used merely as examples and other types of frequency resources may be substituted for the BWPs, such as CORESETs, etc., in the various embodiments.

LTE is a mobile network standard for 4G wireless communication of high-speed data developed by the 3GPP (3rd Generation Partnership Project) and specified in its Release 8 document series. The 5G system is an advanced technology from 4G LTE, and provides a new radio access technology (RAT) through the evolution of the existing mobile communication network structure. Implementations for 5G systems or networks are currently being adopted that provide new radio (NR) (also referred to a 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices, such as base stations, may broadcast packets to wireless devices in a cell. For ease of reference, the term "network device" or "network computing device" is used to refer to any of a variety of network elements that may perform operations of various embodiments, non-limiting examples of which include a base station, an eNodeB, a gNodeB, etc. A network device may provision services to wireless devices in a cell using multicast radio bearers (MRBs) and/or data radio bearers (DRBs).

In 5G NR, various parameters are associated with a bandwidth part (BWP) configuration. Such parameters may include subcarrier spacing (SCS), cyclic prefix (CP) length, resource block (RB) indexing, resource allocation (RA) type, and resource block group (RBG) size. In 5G NR, downlink control information (DCI) field sizes may be dependent on the active BWP configuration. As such, when a wireless device (e.g., a User Equipment (UE)) is configured with multiple BWPs, the DCI field size follows the current active BWP for the wireless device. For DCI-based BWP-switching, each DCI field is interpreted based on the newly active BWP. For a DCI field, if the number of bits necessary for the newly active BWP (e.g., k1 bits) is smaller than that for the previous active BWP (e.g., k2 bits), the (k2−k1) most significant bit (MSB) bits for the DCI field are set to zero. If the number of bits necessary for the newly active BWP (e.g., k1 bits) is bigger than that for the previous active BWP (e.g., k2 bits), the wireless device considers (k1−k2) MSB bits for the DCI field to be set to zero.

In 5G NR, multicast transmissions should be able to be received by multiple wireless devices. To enable multicast transmissions to be received by multiple wireless devices, the SCS, CP length, RB indexing, RA type, and RBG size for multicast transmissions cannot be wireless device specific and tied directly to each wireless device's specific BWP.

One solution to enabling multicast transmissions in a Fifth Generation (5G) New Radio (NR) network to be received by multiple wireless devices may be to allocate multicast frequency resources for multicast communication, such as multicast BWPs for multicast reception of a multicast service and/or virtual BWPs for unicast reception of a multicast service.

In some embodiments, the multicast BWP may be a wireless device common BWP configured to be used by all wireless devices in communication with the base station. In some embodiments, resource allocation related parameters may be provided in the wireless device common BWP configuration. A wireless device receiving the wireless device common BWP may activate the wireless device common BWP to receive the multicast services broadcast by the base station. In some embodiments, the indication of the wireless device common BWP may indicate resource allocation related parameters such that a receiving wireless device considers a lowest resource block (RB) index of the wireless device common BWP as an initial physical resource block (PRB) (e.g., PRB #0) of the wireless device common BWP.

In some embodiments, the wireless device common BWP may have the same SCS and CP length of an active wireless device specific BWP and the wireless device common BWP may be fully contained within the wireless device specific BWP. In such cases, the wireless device may monitor the physical downlink control channel (PDCCH) search space sets for unicast (C-RNTI) and for multicast (G-RNTI) for the same serving cell and the network (e.g., the base station) can schedule either unicast or multicast (or both) at the same time. In some embodiments, search space (SS) sets for unicast and multicast may be configured in the wireless device specific BWP and wireless device common BWP configurations separately and respectively. In some embodiments, the wireless device may be configured to monitor the PDCCH for unicast and the PDCCH for multicast in the SS sets in both the wireless device specific BWP and wireless device common BWP configurations for the same serving cell at the same time.

In some embodiments, the multicast BWP may be a virtual BWP. In some embodiments, the virtual BWP may not be a defined actual BWP, but rather the virtual BWP may be a subset of parameters of a BWP. The virtual BWP may be configured by the base station to be fully contained in a wireless device specific BWP with the same SCS and CP length. In some embodiments, the network (e.g., the base station) may configure the virtual BWP such that the wireless devices receiving the same multicast service may have active BWPs that fully contain the virtual BWP. In some embodiments, the virtual BWP may be identified to a wireless device by a configuration element, such as a starting RB and RB length element. In some embodiments, the bandwidth of the virtual BWP may be identified to a wireless device by a control resource set (CORESET) bandwidth configuration. As an example, the wireless device may be configured with a particular CORESET for multicast. The virtual BWP bandwidth may be determined by the lowest and the highest RB indexes of the CORESET for multicast. In some embodiments, should the wireless device be configured with multiple special CORESETs for multicast, the virtual BWP bandwidth may be determined to be at the union of the multiple CORESETs (e.g., the lowest RB index among the CORESETs to the highest RB index among the CORESETs).

In a 5G NR network, a wireless device may be configured with multiple DL BWPs, such as four DL BWPs. Only one of the DL BWPs may be active for the wireless device at a given time. As wireless devices may be configured to support multiple DL BWPs in a 5G NR network, various embodiments may enable a wireless device to be configured with multiple, such as two or more, three, four, etc., downlink (DL) frequency resources for multicast communication. For example, various embodiments may enable a wireless device to be configured with multiple multicast BWPs. In some embodiments, the determination of which of the DL frequency resources to monitor may be based on the active DL BWP of the wireless device. For example, the determination of which multicast BWP of the multiple multicast BWPs configured for the wireless device may be based on the active DL BWP of the wireless device.

In some embodiments, a base station may configure a DL frequency resource for multicast communication for each DL BWP configured within a carrier bandwidth (e.g., for each DL BWP scheduled for a carrier bandwidth). In this manner, the base station may configure DL frequency resources for multicast communication such that there may be a one-to-one association between DL BWPs and DL frequency resources for multicast communication. In some embodiments, more than one DL BWPs may be associated with a DL frequency resource for multicast communication. In this manner, the relationship between DL BWPs and a DL frequency resource for multicast communication may be a many-to-one relationship (e.g., N:1). For example, when DL BWPs may be partially overlapping, the partially overlapping DL BWPs may point to the same DL frequency resource for multicast communication. In some embodiments, the association (or linkage) between a DL BWP and a DL frequency resource for multicast communication may be indicated by identifiers and/or pointers, such as BWP identifiers, etc. In some embodiments, the linkage (or association) between DL BWPs and DL frequency resources for multicast communication may be indicated to a wireless device via radio resource control (RRC) messaging. In some embodiments, a base station may update the linkage (or association) between DL BWPs and DL frequency resources for multicast communication. The update of the linkage (or association) between DL BWPs and DL frequency resources for multicast communication may be indicated to a wireless device via downlink control information (DCI) and/or a Media Access Control (MAC) Control Element (CE) message.

In some embodiments, the configuration of DL BWPs to DL frequency resources for multicast communication may be explicitly signaled by the base station to one or more wireless devices. In some embodiments, the configuration of DL BWPs to DL frequency resources for multicast communication may not be explicitly signaled by the base station to one or more wireless devices. In some embodiments, the configuration of DL BWPs to DL frequency resources for multicast communication may be implicit in the configuration of the DL frequency resources such that the wireless device applies determination rules independent of direct signaling from the base station to select a DL frequency resource for multicast communication to monitor. In some embodiments, a base station may configure DL frequency resources for multicast communication without associating those DL frequency resources for multicast communication with DL BWPs.

In various embodiments, a wireless device may be configured to select a DL frequency resource for multicast communication of multiple frequency resources for multicast communication from a base station to monitor for transmission of multicast data from the base station based at least in part on the wireless device's active DL BWP. In some embodiments, a wireless device may be configured to select a DL frequency resource for multicast communication that is fully contained within the active BWP of the wireless device and/or has a same numerology as the active BWP. In some embodiments, more than one DL frequency resource for multicast communication may be fully contained within the active BWP of the wireless device and may have a same numerology as the active BWP. In some embodiments, a wireless device may be configured to select one DL frequency resource for multicast communication based on a tie breaker condition for DL frequency resources for multicast communication. In some embodiments, the tie breaker condition may be based on DL frequency resource for multicast communication configuration, such as the lowest DL frequency resource for multicast communication identifier (e.g., lowest multicast BWP ID), such as an explicit priority parameter, etc. In some embodiments, the tie breaker condition may be a wireless device setting of a preferred DL frequency resource for multicast communication.

In various embodiments, a base station may send an indication of a configuration of DL frequency resources for multicast communication via a unicast RRC message. In the unicast RRC message different DL BWPs may point to the same DL frequency resource for multicast communication. In some embodiments, a base station may send an indication of a configuration of DL frequency resources for multicast communication in a broadcast RRC message, such as via the Multicast Control Channel (MCCH), a System Information Block (SIB) message, etc. All wireless devices may receive the same set of DL frequency resources for multicast communication, but different wireless devices may use different subsets of the DL frequency resources for multicast communication. For example, various ones of the wireless devices receiving the multicast RRC message may implicitly activate certain of the DL frequency resources for multicast communication based on that wireless device's active DL BWP at a given time. As another example, various ones of the wireless devices receiving the multicast RRC message may be additionally signaled by unicast RRC messaging from the base station to activate certain ones of the DL frequency resources for multicast communication. In some embodiments, the configuration of the DL frequency resources for multicast communication may be different for different channels. For example, the MCCH and Multicast Traffic Channel (MTCH) may be associated with different DL frequency resources for multicast communication. As a specific example, the MCCH may use an initial multicast BWP and the MTCH may use a different BWP.

In various embodiments, a wireless device may provide multicast feedback data to a base station. In some embodiments, a wireless device may be configured to report feedback for the multicast reception to the base station. For example, the wireless device may be configured to send acknowledgement (ACK) messages and/or negative acknowledgement (NAK) messages to the base station based on whether or not multicast data is successfully received by the wireless device.

In some embodiments, multicast feedback data may be sent in a unicast manner to the base station. In some embodiments, each wireless device may have its own dedicated resource for reporting hybrid-automatic Repeat Request (ARQ) (HARQ) ACK messages to the base station. The wireless device may determine a feedback configuration for the active DL BWP and send multicast feedback data to the base station according to the feedback configuration for the active DL BWP.

In some embodiments, multicast feedback data may be sent in a NAK group-based manner to the base station. In some embodiments, multiple wireless devices may transmit the same sequence when multicast data is not successfully received and different active BWPs may be associated with different resources for feedback reporting. In some embodiments, one or more uplink (UL) frequency resources for multicast communication may be configured by a base station and associated with the DL BWPs configured by the base station. In some embodiments, each UL frequency resource may be associated with one of the DL frequency resources for multicast communication. In some embodiments, the selection of the UL frequency resource for multicast communication to use for feedback reporting may be based on the active DL BWP. In some embodiments, the DL frequency resource for multicast communication configuration indication from the base station may indicate a resource configuration to use for multicast feedback.

In various embodiments, the configuration of DL frequency resources for multicast communication by a base station may be on a per service basis. For example, the DL frequency resources for multicast communication may be configured on a per group-radio network temporary identifier (G-RNTI) basis. In some embodiments, different DL frequency resources for multicast communication may be associated with different services. In some embodiments, different G-RNTIs may have different DL frequency resources for multicast communication configurations, such as different multicast BWP configurations. The different configurations may include, for example, different feedback resources, different mappings between DL BWPs and DL frequency resources for multicast communication, etc. In some embodiments, a wireless device in an active DL BWP with an associated DL frequency resource for multicast communication may not monitor the G-RNTI corresponding to the active DL BWP. In some embodiments, a given service may have multiple DL frequency resources for multicast communication. In some embodiments, the different DL frequency resources for multicast communication may be separately configured for each service. In some embodiments, determinations of which DL frequency resources for multicast communication to use for a service may be performed by a wireless device separately for each service. In some embodiments, different services may have different sets of frequency resources, and a determination of the frequency resource to monitor may include determining a frequency resource for each service.

In some embodiments, different DL frequency resources for multicast communication may have different configurations. For example, the different configurations may be different search space sets and/or different physical channel configurations, such as different Physical Downlink Shared Channel (PDSCH) configurations, etc.

In some embodiments, the configuration of the DL frequency resources for multicast communication may be based on a CORESET. For example, each DL frequency resources for multicast communication may have its own CORESET and the DL frequency resource for multicast communication may be different for each active BWP based on the respective CORSET.

In some embodiments, the DL frequency resources for multicast communication may be CORESETs for multicast communication. In some embodiments, the DL frequency resources for multicast communication may be BWPs for multicast communication.

FIG. 1 is a system block diagram illustrating an example communication system 100 suitable for implementing any of the various embodiments. The communication system 100 may be a 5G New Radio (NR) network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting.

The communication system 100 may include a heterogeneous network architecture that includes a core network 140 and a variety of mobile devices (illustrated as wireless device 120*a*-120*e* in FIG. 1). The communication system 100 may also include a number of base stations (illustrated as the BS 110*a*, the BS 110*b*, the BS 110*c*, and the BS 110*d*) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communication system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communication system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communication system 100 may be a heterogeneous network that includes base stations of different types, for example, macro base stations, pico base stations, femto base stations, relay base stations, etc. These different types of base stations may have different transmit power levels, different coverage areas, and different impacts on interference in communication system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communication system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless device 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, some embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some embodiments, two or more wireless devices 120a-e (for example, illustrated as the wireless device 120a and the wireless device 120e) may communicate directly using one or more sidelink channels 124 (for example, without using a base station 110a-110d as an intermediary to communicate with one another). For example, wireless device 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

Figure 2:
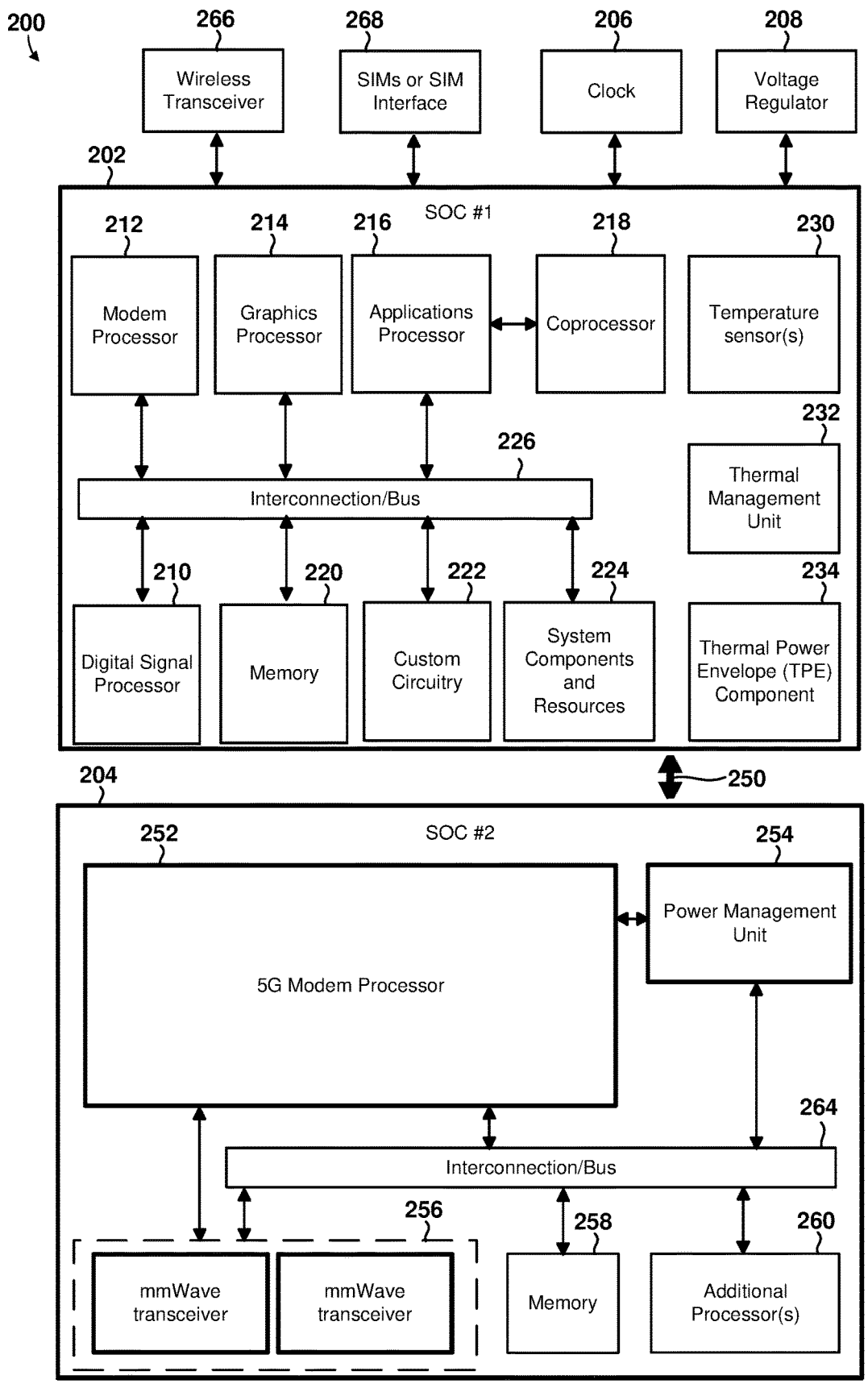
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example wireless device 200 (which may be a SIP in some embodiments) includes a two SOCs 202, 204 coupled to a clock 206, a voltage regulator 208, at least one SIM 268 and/or a SIM interface and a wireless transceiver 266 configured to send and receive wireless communications via an antenna (not shown) to/from network devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5G NR subscription and a second 5G NR subscription, etc.

In addition to the example SIP 200 discussed above, various embodiments may be implemented in a wide variety of computing systems, which may include a single processor, multiple processors, multicore processors, or any combination thereof.

Figure 3A:
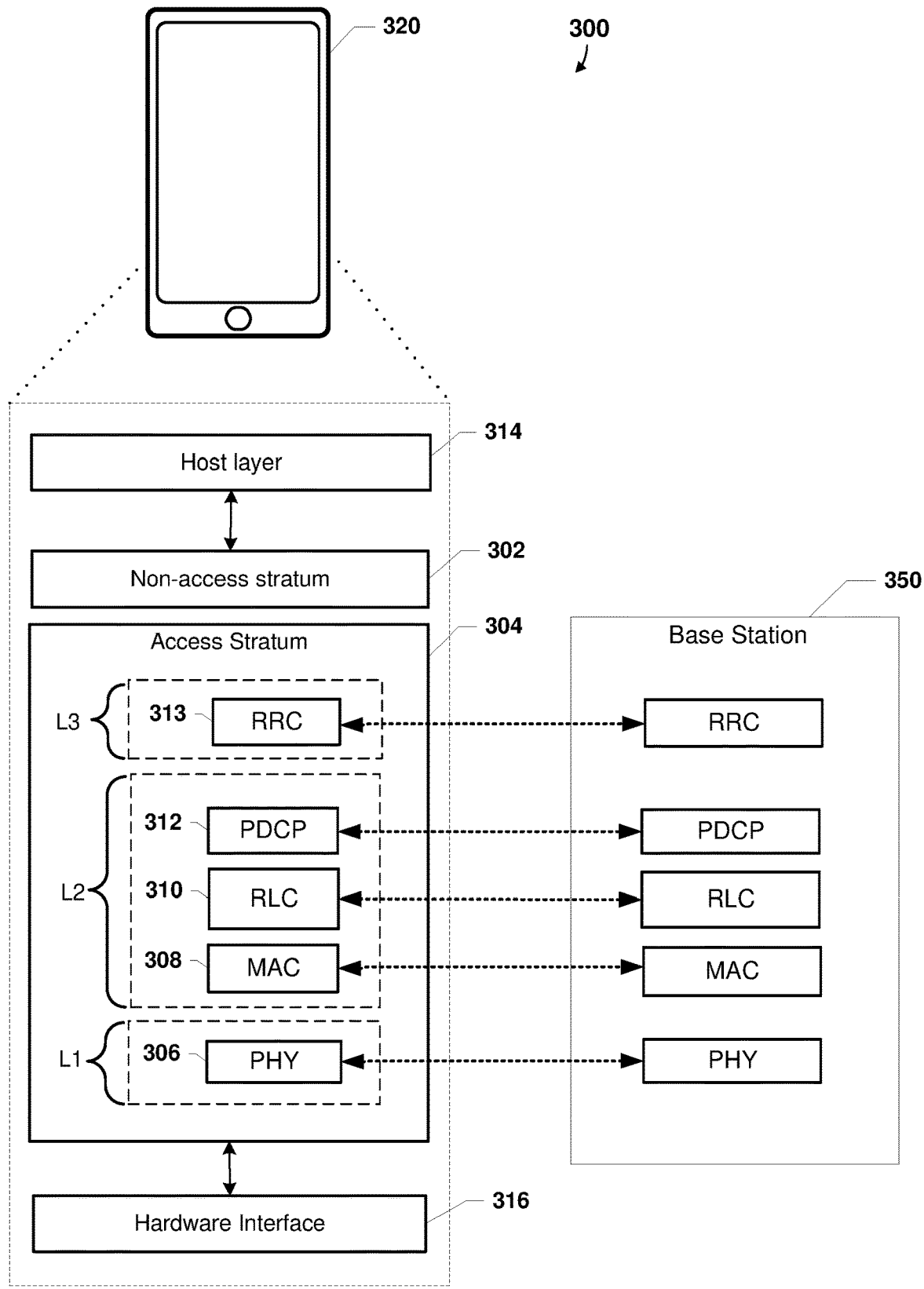
FIG. 3A is a diagram illustrating an example of a software architecture including a radio protocol stack for the user and control planes in wireless communications in accordance with various embodiments.

FIG. 3A illustrates an example of a software architecture 300 including a radio protocol stack for the user and control planes in wireless communications between a base station 350 (e.g., the base station 110*a*) and a wireless device (UE computing device) 320 (e.g., the wireless device 120*a*-120*e*, 200). With reference to FIGS. 1-3A, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 3B:
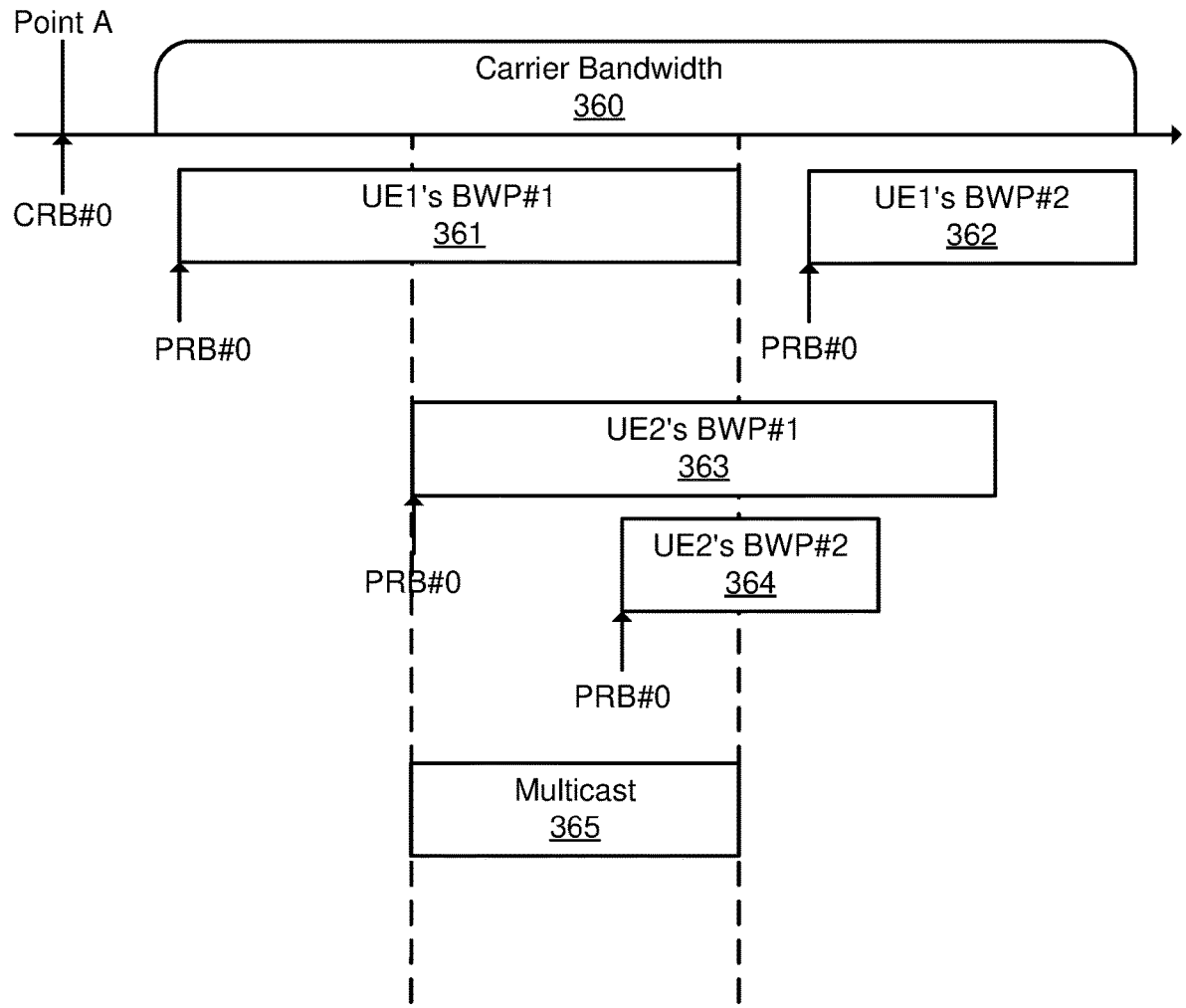
FIG. 3B is a diagram illustrating bandwidth part (BWP) allocations in a carrier bandwidth.

FIG. 3B is a diagram illustrating allocations in a carrier bandwidth 360. With reference to FIGS. 1-3B, the carrier bandwidth 360 may be defined relative to an initial carrier resource block (CRB), such as CRB #0 at Point A. The carrier bandwidth 360 may be the frequency band over which a 5G NR base station (e.g., the base station 110a, 350) provides services to wireless devices (for example referred to as UE1 and UE2 in FIG. 3B) in communication with the base station. BWPs for wireless devices (e.g., the wireless device 120a-120e, 200, 320) may be defined within the carrier bandwidth 360 such that the wireless devices may receive services in the carrier bandwidth 360. In some embodiments, wireless devices may have one or more BWP. For example, a wireless device may be configured with up to four downlink (DL) BWPs. In some embodiments, a wireless device may activate only one BWP at a time. In some embodiments, a wireless device may activate more than one BWP at a time. FIG. 3B illustrates four example BWPs, UE1's BWP #1 361, UE1's BWP #2 362, UE2's BWP #1 363, and UE2's BWP #2 364. Each BWP 361-364 may have its own respective PRB indexing starting from zero (e.g., PRB #0). As illustrated in FIG. 3B, multicast services 365 may be transmitted by the base station in a portion of the carrier bandwidth 360. Based on the overlap between the BWPs, the two wireless devices (e.g., UE1 and UE2 referenced in FIG. 3B) may receive the multicast services 365 if UE1 activates BWP #1 361 and UE2 activates BWP #1 363. However, if UE1 activates BWP #2 362 and UE2 activates BWP #2 364, UE1 and UE2 will not receive the multicast services 365. Additionally, UE 1's BWP #1 361 and UE2's BWP #1 363 have non-aligned PRB indexing and the configured SCS, CP length, RA Type, etc. for the BWPs may be different. The multiple different wireless device-specific BWPs of wireless devices in communication with a base station and the failure of wireless device-specific BWPs to necessarily overlap the multicast transmissions complicates radio resource allocation to support multicast services from a 5G NR base station.

Figure 3C:
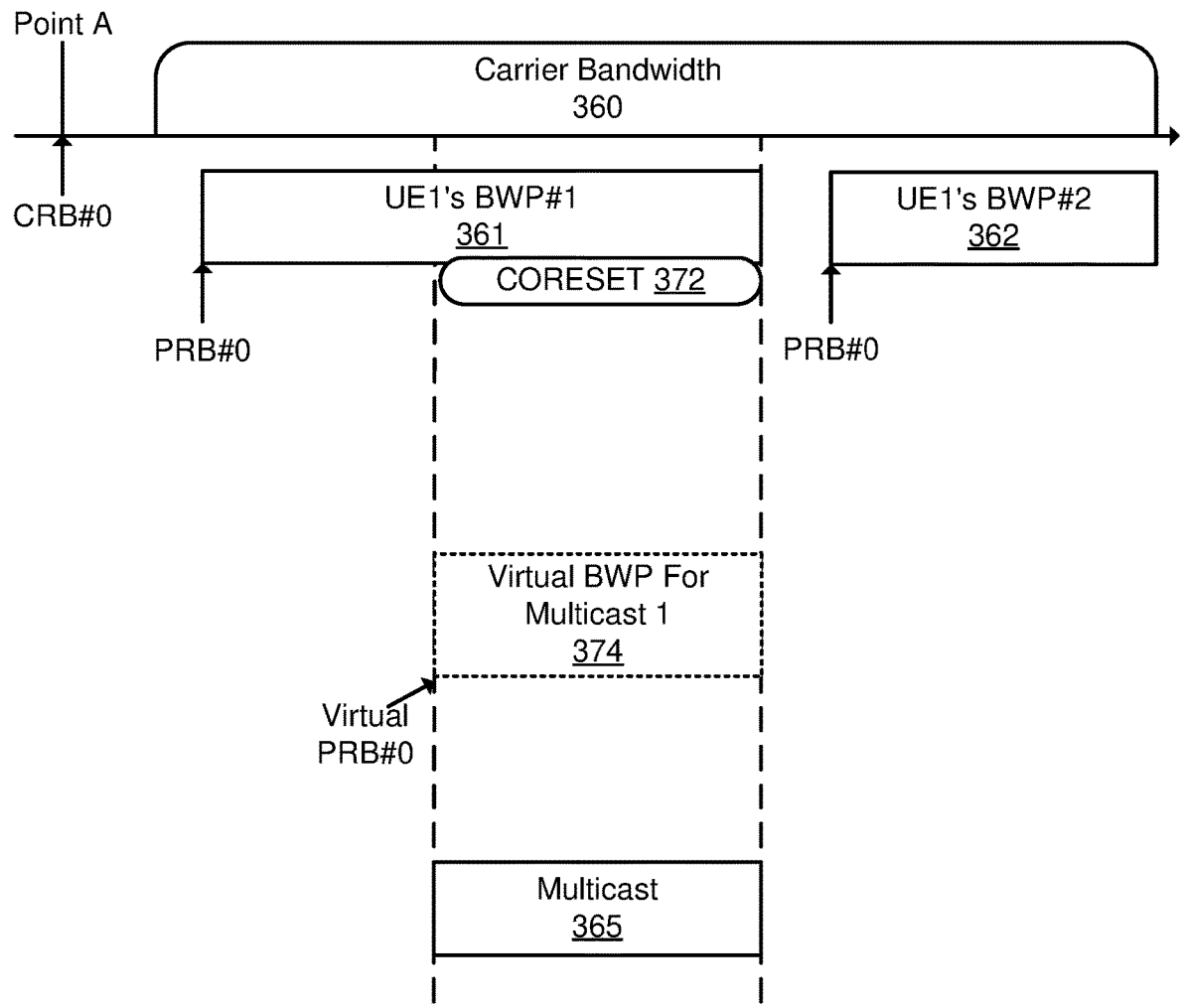
FIG. 3C is a diagram illustrating a virtual frequency resource for multicast communication allocations in a carrier bandwidth in accordance with various embodiments.

One solution to support multicast services from a base station according to various embodiments, such as 5G NR base station according to various embodiments, may be to configure a downlink (DL) frequency resource for multicast communication with the carrier bandwidth 360 as illustrated in FIG. 3C. FIG. 3C illustrates a DL frequency resource as a multicast BWP that is a virtual BWP allocation 374 in the carrier bandwidth 360 in accordance with various embodiments. With reference to FIGS. 1-3C, the virtual BWP allocation 374 may not be a defined actual BWP, but rather the virtual BWP 374 may be a subset of parameters of a BWP. The virtual BWP 374 may be configured by the base station to be fully contained in a wireless device's (referred to as UE1 in FIG. 3C) specific BWP #1 361 with the same SCS and CP length. In various embodiments, the network (e.g., the base station) may configure the virtual BWP 361 such that the wireless devices receiving the same multicast service 365 may have active DL BWPs that fully contain the virtual BWP 361. In some embodiments, the virtual BWP 361 may be identified to a wireless device by a configuration element, such as a starting RB and RB length element.

FIG. 3C also illustrates that the virtual BWP 374 may be identified to a wireless device by a CORESET 372 bandwidth configuration. As an example, the wireless device may be configured with a special CORESET 372 for multicast. The virtual BWP 374 bandwidth may be determined by the lowest and the highest RB indexes of the CORESET 372 for multicast. In some embodiments, should the wireless device be configured with multiple special CORESETs for multicast, the virtual BWP 374 bandwidth may be determined to be at the union of the multiple CORESETs (e.g., the lowest RB index among the CORESETs to the highest RB index among the CORESETs).

Figure 3D:
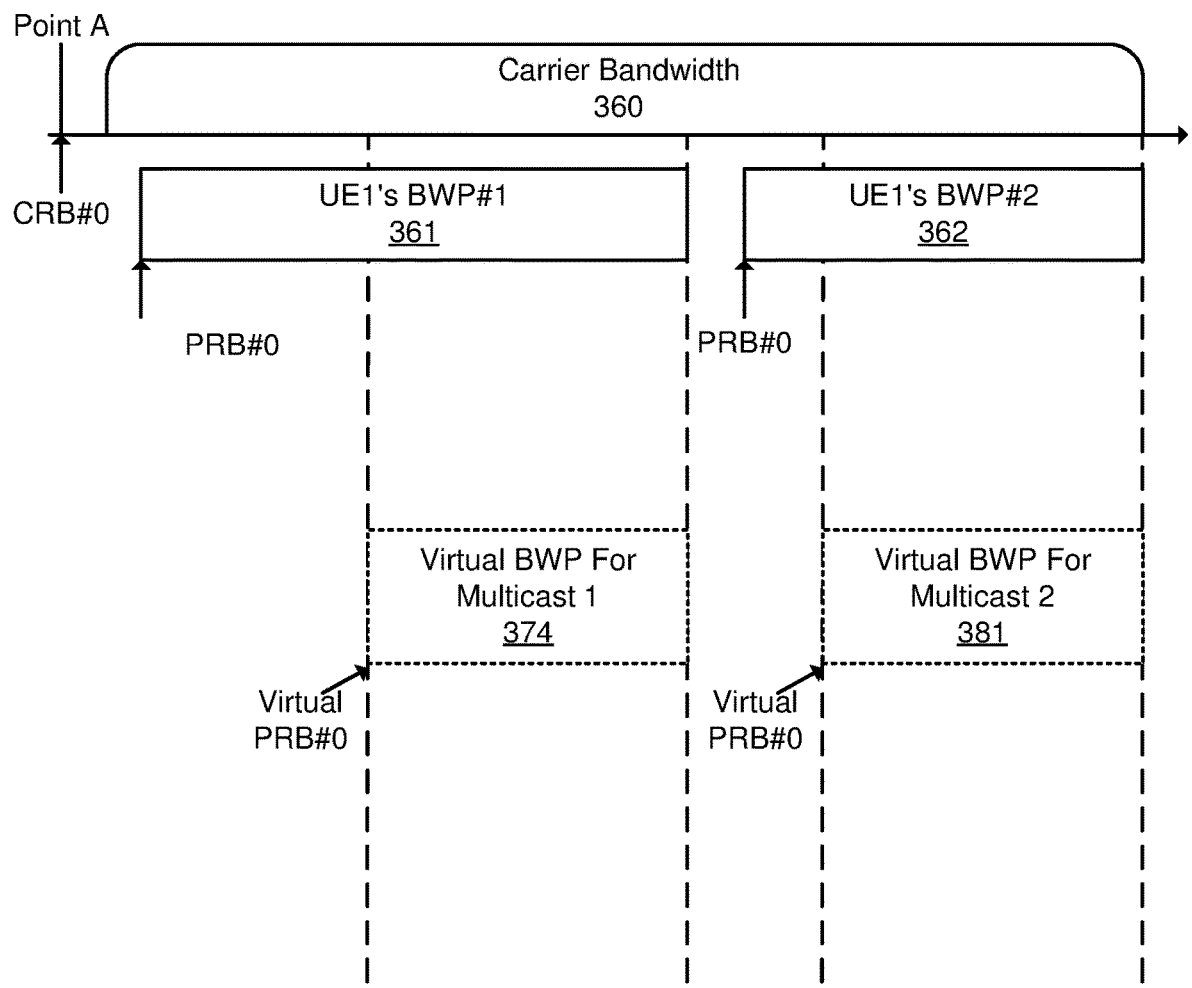
FIG. 3D is a diagram illustrating a virtual frequency resource for multicast communication allocations in a carrier bandwidth in accordance with various embodiments.

A further solution to support multicast services from a base station according various embodiments, such as 5G NR base station according to various embodiments, may be to configure multiple DL frequency resources for multicast communication with the carrier bandwidth 360 as illustrated in FIG. 3D. FIG. 3D illustrates a first DL frequency resource as a first multicast BWP that is a virtual BWP allocation 374 in the carrier bandwidth 360 and a second DL frequency resource as a second multicast BWP that is a virtual BWP allocation 381 in the carrier bandwidth 360 in accordance with various embodiments. With reference to FIGS. 1-3D, the virtual BWP allocations 374, 381 may not be defined actual BWPs, but rather the virtual BWP allocations 374, 381 may be a subset of parameters of BWPs. As illustrated in FIG. 3D, the first virtual BWP allocation 374 may be associated with the first DL BWP 361 of the wireless device and the second virtual BWP allocation 381 may be associated with the second DL BWP 362. The virtual BWPs 374, 381 may be configured by the base station to be fully contained in a wireless device each of the wireless device's (referred to as UE1 in FIG. 3D) respective specific BWPs, such as BWP #1 361 and BWP #2 362. In this manner a wireless device may be configured with multiple DL frequency resources for multicast communication, such as multiple virtual multicast BWPs. In some embodiments, the wireless device may determine the virtual BWP allocation 374 or 381 to monitor based on the active DL BWP 361 or 362.

Figure 4A:
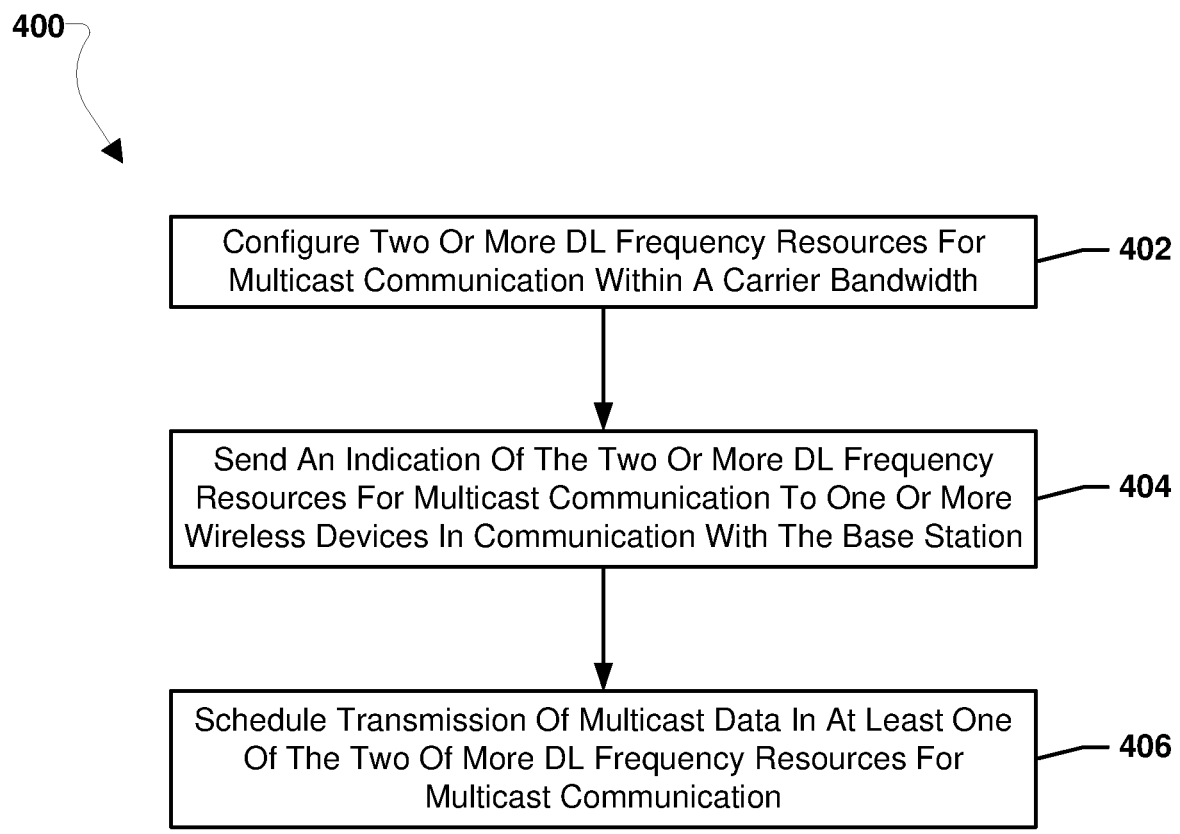
FIG. 4A is a process flow diagram illustrating a method for radio resource allocation to support multicast services in accordance with various embodiments.

FIG. 4A is a process flow diagram illustrating a method 400 for radio resource allocation to support multicast services in accordance with various embodiments. With reference to FIGS. 1-4A, the operations of method 400 may be implemented by a processor (e.g., 210, 212, 214, 216, 218, 252, 260) of a network computing device (e.g., the base station 110a-d, 350). With reference to FIGS. 1-4A, means for performing each of the operations of the method 400 may be one or more processors of a network computing device (e.g., the base station 110a-d, 350), such as one or more of the processors 210, 212, 214, 216, 218, 252, 260.

In block 402, the processor may perform operations including configuring two or more downlink (DL) frequency resources for multicast communication within a carrier bandwidth. In some embodiments, configuring the two or more DL frequency resources for multicast communication within the carrier bandwidth may include determining two or more DL BWPs configured within (e.g., scheduled for) the carrier bandwidth and configuring a DL frequency resource for multicast communication for each of the two or more DL BWPs configured within (e.g., scheduled for) the carrier bandwidth. In some embodiments, configuring the two or more DL frequency resources for multicast communication within the carrier bandwidth may include determining two or more DL BWPs configured within (e.g., scheduled for) the carrier bandwidth and configuring one DL frequency resource for multicast communication for each respective DL BWP of the two or more DL BWPs configured within (e.g., scheduled for) the carrier bandwidth. In this manner, the DL BWPs configured within (e.g., scheduled for) the carrier bandwidth may be one-to-one mapped to respective individual DL frequency resources for multicast communication. In some embodiments, at least one of the two or more DL frequency resources for multicast communication within the carrier bandwidth may be associated with two or more DL BWPs configured within (e.g., scheduled for) the carrier bandwidth. In some embodiments, the two or more DL frequency resources for multicast communication may be two or more CORESETs for multicast communication. In some embodiments, the two or more DL frequency resources for multicast communication may be two or more bandwidth parts (BWPs) for multicast communication. In some embodiments, each of the two or more DL frequency resources for multicast communication may be associated with different services. In some embodiments, the different services may be associated with different G-RNTIs. In some embodiments, each of the two or more DL frequency resources for multicast communication may have different configurations. In some embodiments, the different configurations may be different search space sets or different physical channel configurations. In some embodiments, the two or more DL frequency resources for multicast communication may be a plurality of sets of two or more DL frequency resources for multicast communication and each of the plurality of sets may be associated with a different service.

In block 404, the processor may perform operations including sending an indication of the two or more DL frequency resources for multicast communication to one or more wireless devices in communication with the base station. In some embodiments, the indication of the two or more DL frequency resources for multicast communication may include an indication of association of each of the two or more DL frequency resources for multicast communication with at least one DL BWP. In some embodiments, the indication of the association may include a pointer to the at least one DL BWP or an identifier of the at least one DL BWP. In some embodiments, the at least one DL BWP may be associated with a unicast transmission. In some embodiments, sending the indication of the two or more DL frequency resources for multicast communication to the one or more wireless devices in communication with the base station may include sending the indication of the two or more DL frequency resources for multicast communication to the one or more wireless devices in communication with the base station in a RRC message.

In block 406, the processor may perform operations including scheduling transmission of multicast data in at least one of the two or more DL frequency resources for multicast communication. In some embodiments, the base station may send multicast data in at least one of the two or more DL frequency resources for multicast communication according to the schedule.

Figure 4B:
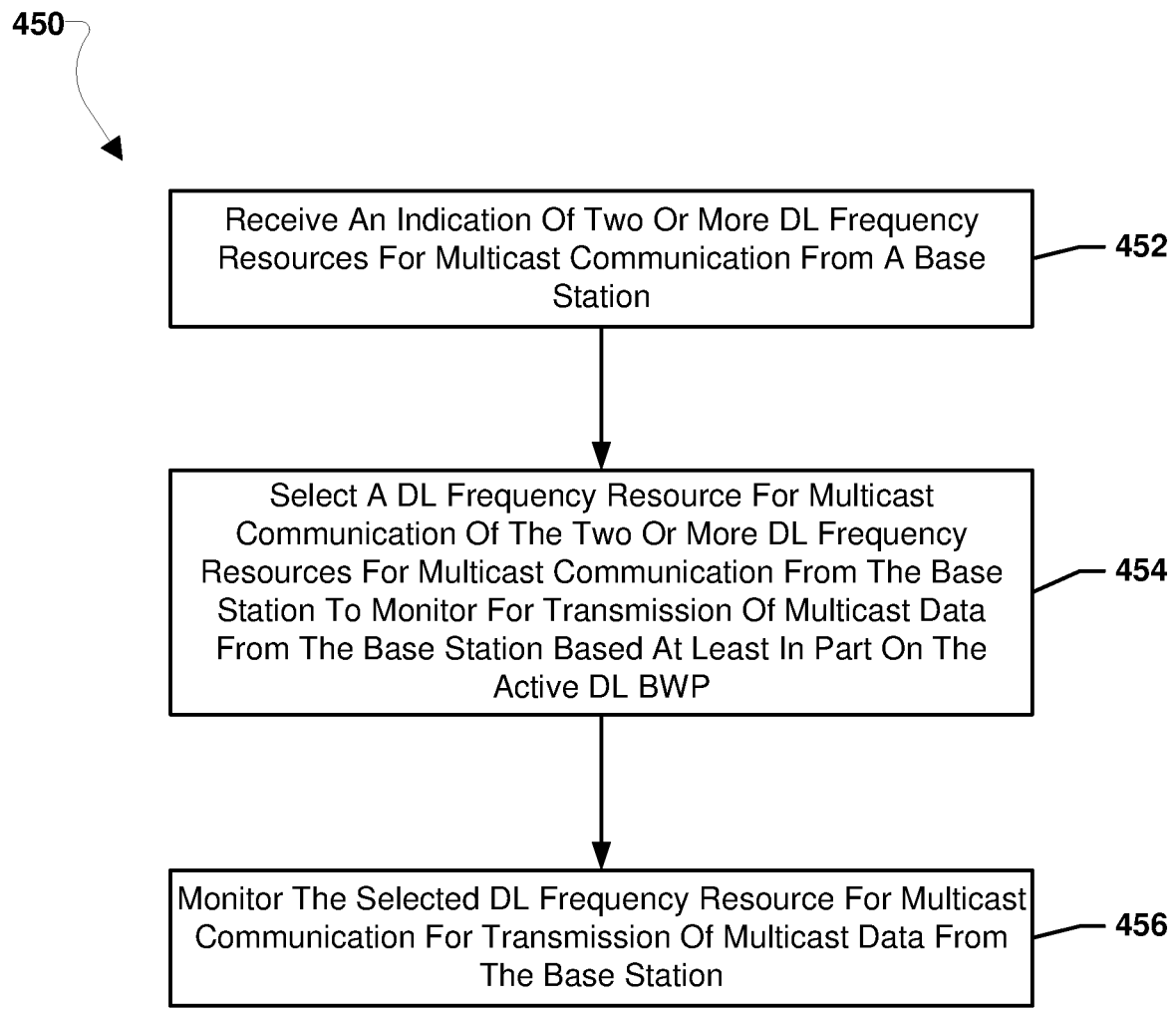
FIG. 4B is a process flow diagram illustrating a method for radio resource allocation to support multicast services in accordance with various embodiments.

FIG. 4B is a process flow diagram illustrating a method 450 for radio resource allocation to support multicast services in accordance with various embodiments. With reference to FIGS. 1-4B, the operations of the method 400 may be performed by a processor (such as the processor 210, 212, 214, 216, 218, 252, 260) of a wireless device (such as the wireless device 120a-120e, 200, 320). With reference to FIGS. 1-4B, means for performing each of the operations of the method 450 may be one or more processors of a wireless device (such as the wireless device 120a-120e, 200, 320), such as one or more of the processors 210, 212, 214, 216, 218, 252, 260. In some embodiments, the operations of the method 450 may be performed in conjunction with the operations of the method 400 (FIG. 4A).

In block 452, the processor may perform operations including receiving an indication of two or more DL frequency resources for multicast communication from a base station. In some embodiments, receiving the indication of the two or more DL frequency resources for multicast communication from the base station may include receiving the indication of the two or more DL frequency resources for multicast communication from the base station in a unicast RRC message. In some embodiments, receiving the indication of the two or more DL frequency resources for multicast communication from the base station includes receiving the indication of the two or more DL frequency resources for multicast communication from the base station in a multicast RRC message. In some embodiments, the two or more DL frequency resources for multicast communication from the base station may include at least a first DL frequency resource for multicast communication from the base station associated with a multicast control channel, and at least a second DL frequency resource for multicast communication from the base station associated with a multicast traffic channel. In some embodiments, the two or more DL frequency resources for multicast communication may be two or more CORESETs for multicast communication. In some embodiments, the two or more DL frequency resources for multicast communication may be two or more bandwidth parts (BWPs) for multicast communication. In some embodiments, each of the two or more DL frequency resources for multicast communication may be associated with different services. In some embodiments, the two or more DL frequency resources for multicast communication may be a plurality of sets of two or more DL frequency resources for multicast communication and each of the plurality of sets may be associated with a different service. In some embodiments, the different services may be associated with different G-RNTIs. In some embodiments, each of the two or more DL frequency resources for multicast communication may have different configurations. In some embodiments, the different configurations are different search space sets or different physical channel configurations. In some embodiments, each of the two or more DL frequency resources for multicast communication may be mapped to respective individual DL BWPs configured within (e.g., scheduled for) the carrier bandwidth. In some embodiments, the indication of the two or more DL frequency resources for multicast communication may indicate a one-to-one mapping between each of the two or more DL frequency resources for multicast communication and a respective DL BWP configured within (e.g., scheduled for) a carrier bandwidth. Such one-to-one mapping of DL BWPs to DL frequency resources for multicast communication may support selection of a DL frequency resource for multicast communication based at least in part on an active DL BWP mapped to that DL frequency resource for multicast communication.

In block 454, the processor may perform operations including selecting a DL frequency resource for multicast communication of the two or more DL frequency resources for multicast communication from the base station to monitor for transmission of multicast data from the base station based at least in part on an active DL BWP. In some embodiments, selection of the DL frequency resource for multicast communication may be an implicit selection. In some embodiments, selection of the DL frequency resource for multicast communication may be an explicit selection signaled by the base station. In some embodiments, selecting the DL frequency resource for multicast communication of the two or more DL frequency resources for multicast communication from the base station to monitor for transmission of multicast data from the base station based at least in part on the active DL BWP may include receiving an indication from the base station of the DL frequency resource for multicast communication of the two or more DL frequency resources for multicast communication from the base station to monitor in the active DL BWP and selecting the indicated DL frequency resource for multicast communication to monitor in the active DL BWP. In some embodiments, the indication from the base station of the DL frequency resource for multicast communication of the two or more DL frequency resources for multicast communication from the base station to monitor in the active DL BWP may be received from the base station in a unicast RRC message. In some embodiments, the DL frequency resource to monitor may be selected on a per service basis. In some embodiments, selecting the DL frequency resource for multicast communication of the two or more DL frequency resources for multicast communication from the base station to monitor for transmission of multicast data from the base station based at least in part on the active DL BWP may include selecting the DL frequency resource for multicast communication of the two or more DL frequency resources for multicast communication from the base station to monitor for transmission of multicast data from the base station based at least in part on the active DL BWP and a selection of one of the different services.

In block 456, the processor may perform operations including monitoring the selected DL frequency resource for multicast communication for transmission of multicast data from the base station. In this manner, the wireless device may receive multicast data for a multicast service.

Figure 5A:
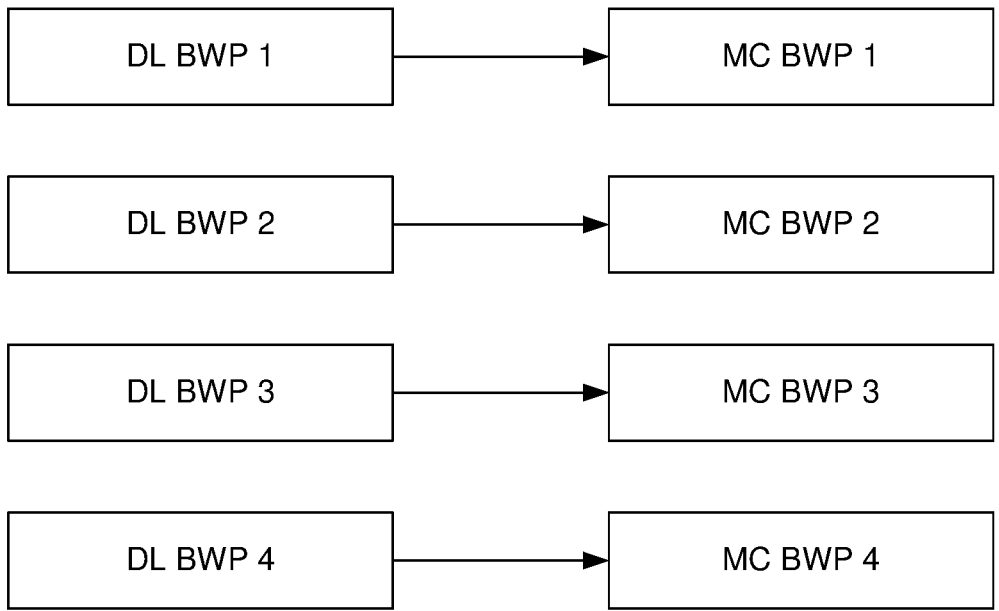
FIG. 5A is a block diagram illustrating associations between downlink (DL) bandwidth parts (BWPs) and DL frequency resources for multicast communication in accordance with various embodiments.

FIG. 5A is a block diagram illustrating associations between downlink (DL) bandwidth parts (BWPs) and DL frequency resources for multicast communication in accordance with various embodiments. With reference to FIGS. 1-5A, FIG. 5A illustrates a one-to-one association between DL BWPs and DL frequency resources for multicast communication, such as multicast BWPs. For example, one DL frequency resource for multicast communication, such as one multicast BWP, may be configured for each respective DL BWP configured within the carrier bandwidth such that each DL BWP is associated with its own respective DL frequency resource for multicast communication, such as its own respective multicast BWP. FIG. 5A illustrates that DL frequency resources for multicast communication, such as multicast BWPs, for each of the DL BWPs configured within a carrier bandwidth may be configured such that there may be a one-to-one mapping between each DL frequency resource for multicast communication and each DL BWP configured within the carrier bandwidth, such as a one-to-one mapping between each multicast BWP and each DL BWP. To support such a one-to-one mapping between each DL frequency resource for multicast communication, such as each multicast BWP, and each DL BWP configured within the carrier bandwidth, in various embodiments, configuring two or more DL frequency resources for multicast communication within a carrier bandwidth may include determining two or more DL BWPs configured within the carrier bandwidth and configuring a DL frequency resource for multicast communication for each of the two or more DL BWPs configured within the carrier bandwidth such that there is a one-to-one mapping between each DL frequency resource for multicast communication and each of the two or more DL BWPs configured within the carrier bandwidth. In the example illustrated in FIG. 5A, MC BWP 1 may be configured for DL BWP 1, MC BWP 2 may be configured for DL BWP 2, MC BWP 3 may be configured for DL BWP 3, and MC BWP 4 may be configured for DL BWP 4.

Figure 5B:
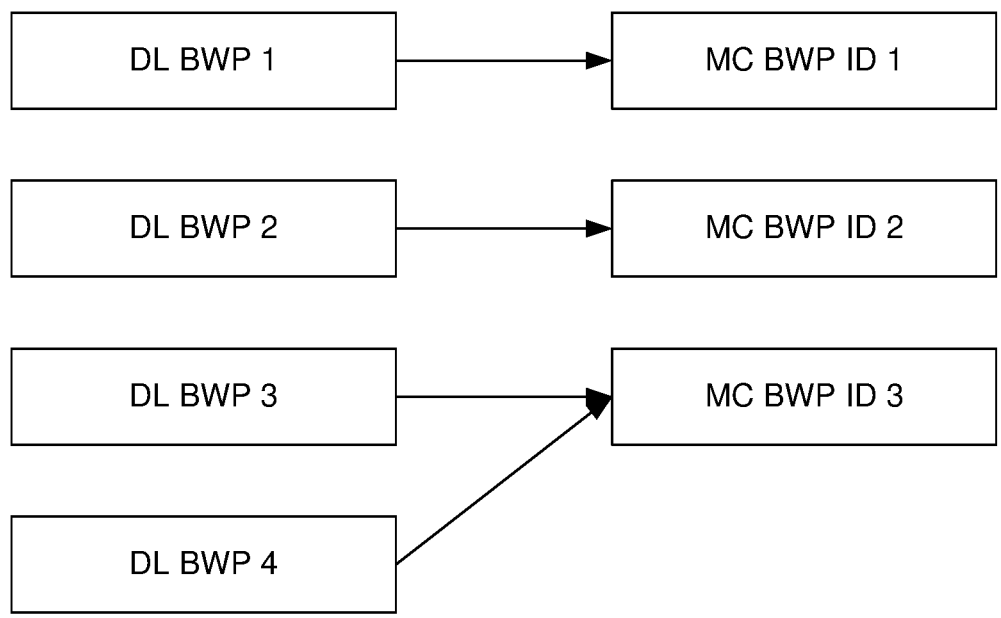
FIG. 5B is a block diagram illustrating associations between DL BWPs and DL frequency resources for multicast communication in accordance with various embodiments.

FIG. 5B is a block diagram illustrating associations between DL BWPs and DL frequency resources for multicast communication in accordance with various embodiments. With reference to FIGS. 1-5B, FIG. 5B illustrates a many-to-one association between DL BWPs and DL frequency resources for multicast communication, such as multicast BWPs. Specifically, FIG. 5B illustrates that DL BWPs 3 and 4 may be mapped to a single multicast BWP, such as multicast BWP ID 3.

Figure 6A:
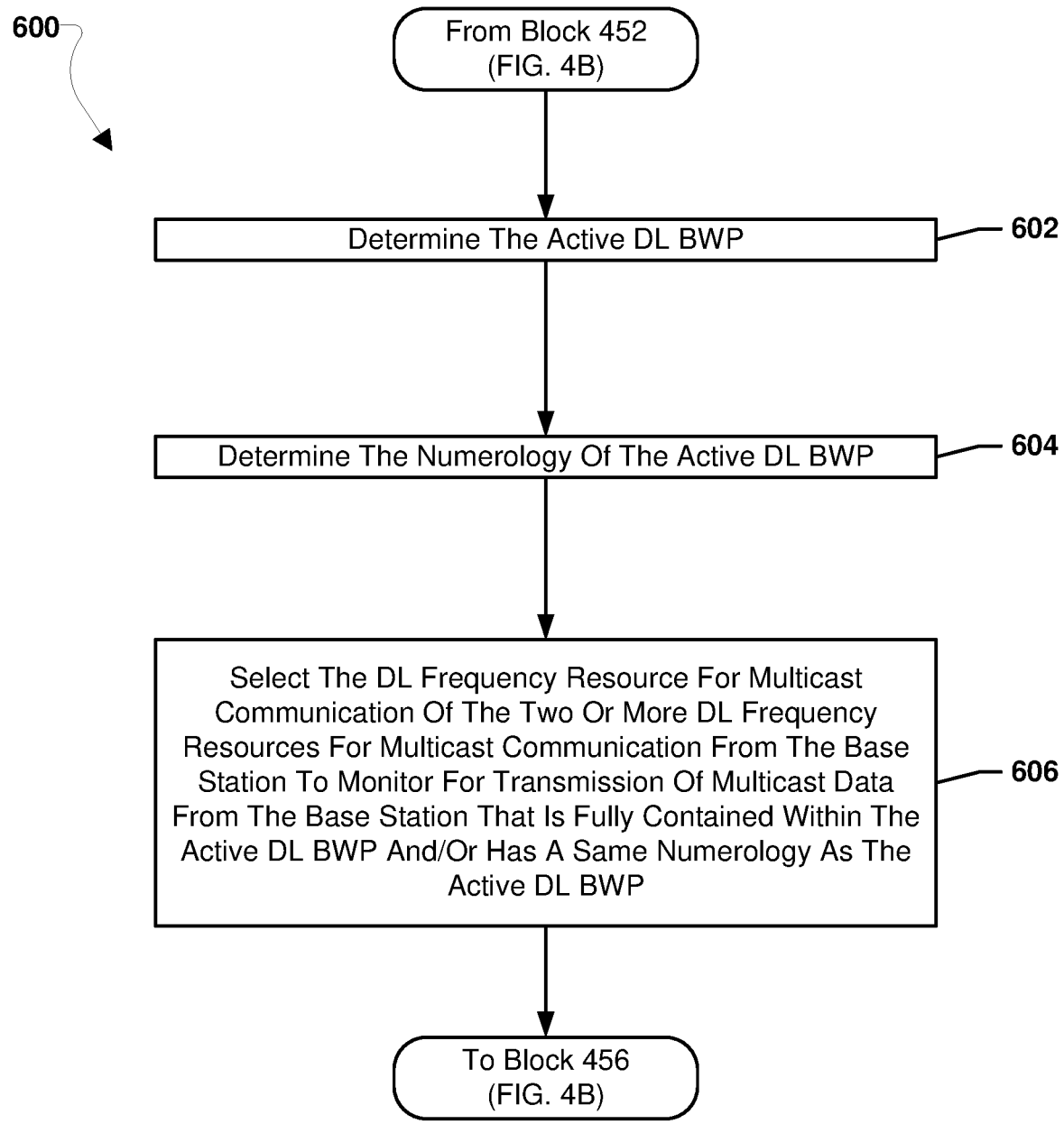
FIG. 6A is a process flow diagram illustrating a method for radio resource allocation to support multicast services in accordance with various embodiments.

FIG. 6A is a process flow diagram illustrating a method 600 for radio resource allocation to support multicast services in accordance with various embodiments. With reference to FIGS. 1-6A, the operations of the method 600 may be performed by a processor (such as the processor 210, 212, 214, 216, 218, 252, 260) of a wireless device (such as the wireless device 120*a*-120*e*, 200, 320). With reference to FIGS. 1-6A, means for performing each of the operations of the method 600 may be one or more processors of a wireless device (such as the wireless device 120*a*-120*e*, 200, 320), such as one or more of the processors 210, 212, 214, 216, 218, 252, 260. In some embodiments, the operations of the method 600 may be performed in conjunction with the operations of the method 450 (FIG. 4B). As a specific example, the operations of method 600 may be performed as part of the operations of block 454 of FIG. 4B to select the DL frequency resource for multicast communication of the two or more DL frequency resources for multicast communication from the base station to monitor for transmission of multicast data from the base station based at least in part on the active DL BWP.

In block 602, the processor may perform operations including determining the active DL BWP.

In block 604, the processor may perform operations including determining a numerology of the active DL BWP.

In block 606, the processor may perform operations including selecting the DL frequency resource for multicast communication of the two or more DL frequency resources for multicast communication from the base station to monitor for transmission of multicast data from the base station that is fully contained within the active DL BWP and/or has a same numerology as the active DL BWP.

Figure 6B:
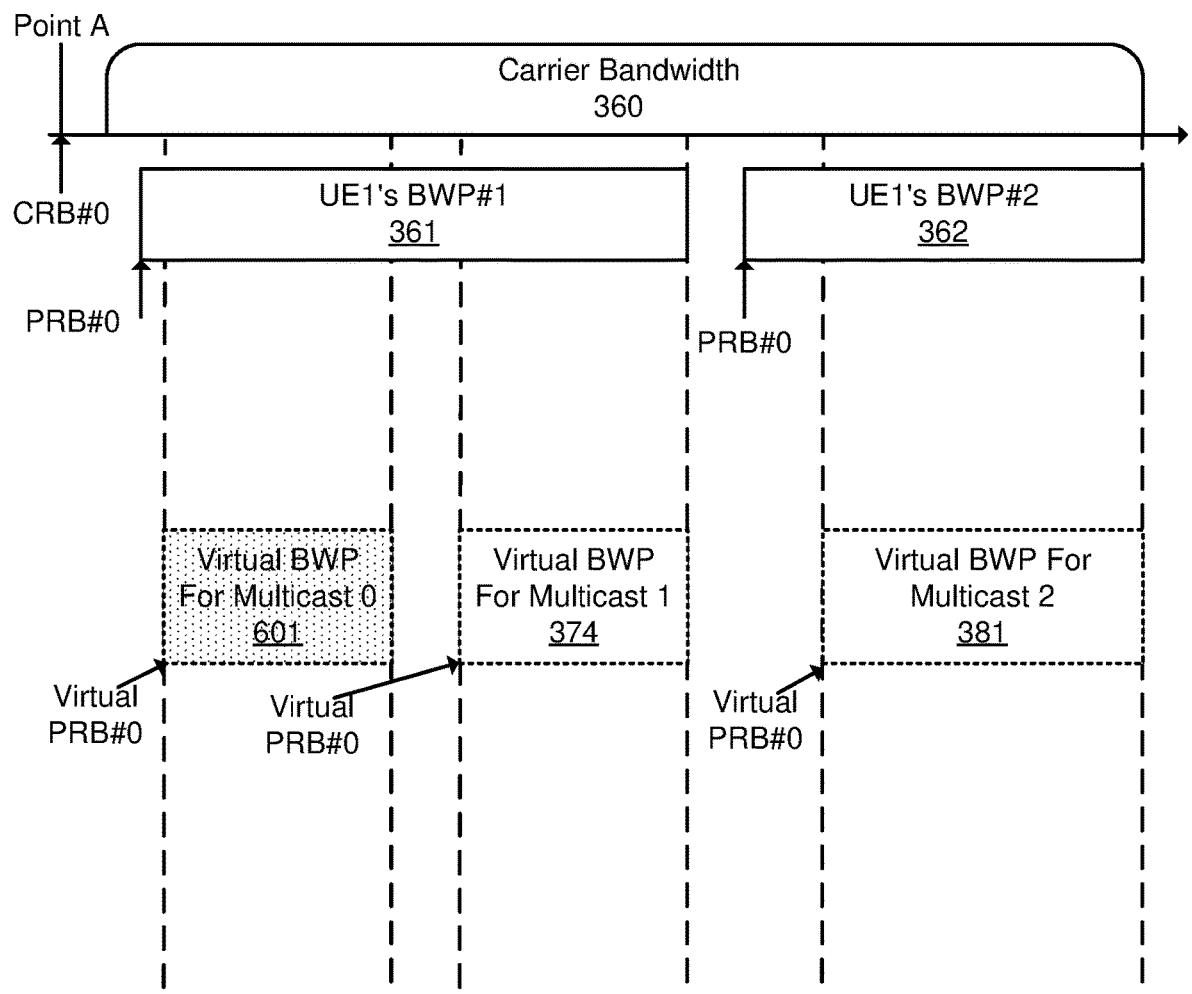
FIG. 6B is a diagram illustrating a virtual frequency resource for multicast communication allocations in a carrier bandwidth in accordance with various embodiments.

FIG. 6B is a diagram illustrating virtual BWP allocations in a carrier bandwidth in accordance with various embodiments. With reference to FIGS. 1-6B, the allocations of DL frequency resources for multicast communication in which more than one DL frequency resource for multicast, such as more than one virtual multicast BWP 601 and 374 are allocated within the same DL BWP 361 is illustrated in FIG. 6B. FIG. 6B illustrates three DL frequency resources as multicast BWPs that are virtual BWP allocations 374, 381, and 601 in the carrier bandwidth 360 in accordance with various embodiments. The virtual BWP allocations 374, 381, 601 may not be defined actual BWPs, but rather the virtual BWP allocations 374, 381, 601 may be a subset of parameters of BWPs. As illustrated in FIG. 6B, the first DL BWP 361 of the wireless device may be associated with more than one virtual BWP allocation, such as virtual BWP allocation 601 for multicast and virtual BWP allocation 374 for multicast. The virtual BWP allocation 601 for multicast and virtual BWP allocation 374 for multicast may both be fully contained within the first DL BWP 361 of the wireless device.

In some embodiments, the wireless device may be configured to select one of the virtual BWP allocation 601 for multicast or the virtual BWP allocation 374 for multicast based on a tie breaker condition. In some embodiments, the tie breaker condition may be a based on the identifier of the DL frequency resource for multicast communication, such as a multicast BWP identifier (BWP ID). For example, the wireless device may be configured such that the tie breaker condition is a lowest DL frequency resource for multicast communication identifier (e.g., a lowest multicast BWP ID). When the first DL BWP 361 of the wireless device is active, the wireless device may select among the fully contained virtual BWP allocations for multicast based on the tie breaker condition. As illustrated in FIG. 6B, the wireless device may select the virtual BWP allocation 601 for multicast as the multicast BWP ID is lower (e.g., 0) than the multicast BWP ID (e.g., 1) of the other fully contained virtual BWP allocation 374 for multicast.

In some embodiments, the tie breaker condition may be a based on an explicit priority parameter, such as a setting of a preferred DL frequency resource for multicast communication. For example, the setting may be a preference for a certain virtual BWP allocation over all other BWPs. In some embodiments, the selection of one fully contained virtual BWP allocations for multicast in an active DL BWP over another fully contained virtual BWP allocation may be a wireless device implementation specific setting.

Figure 6C:
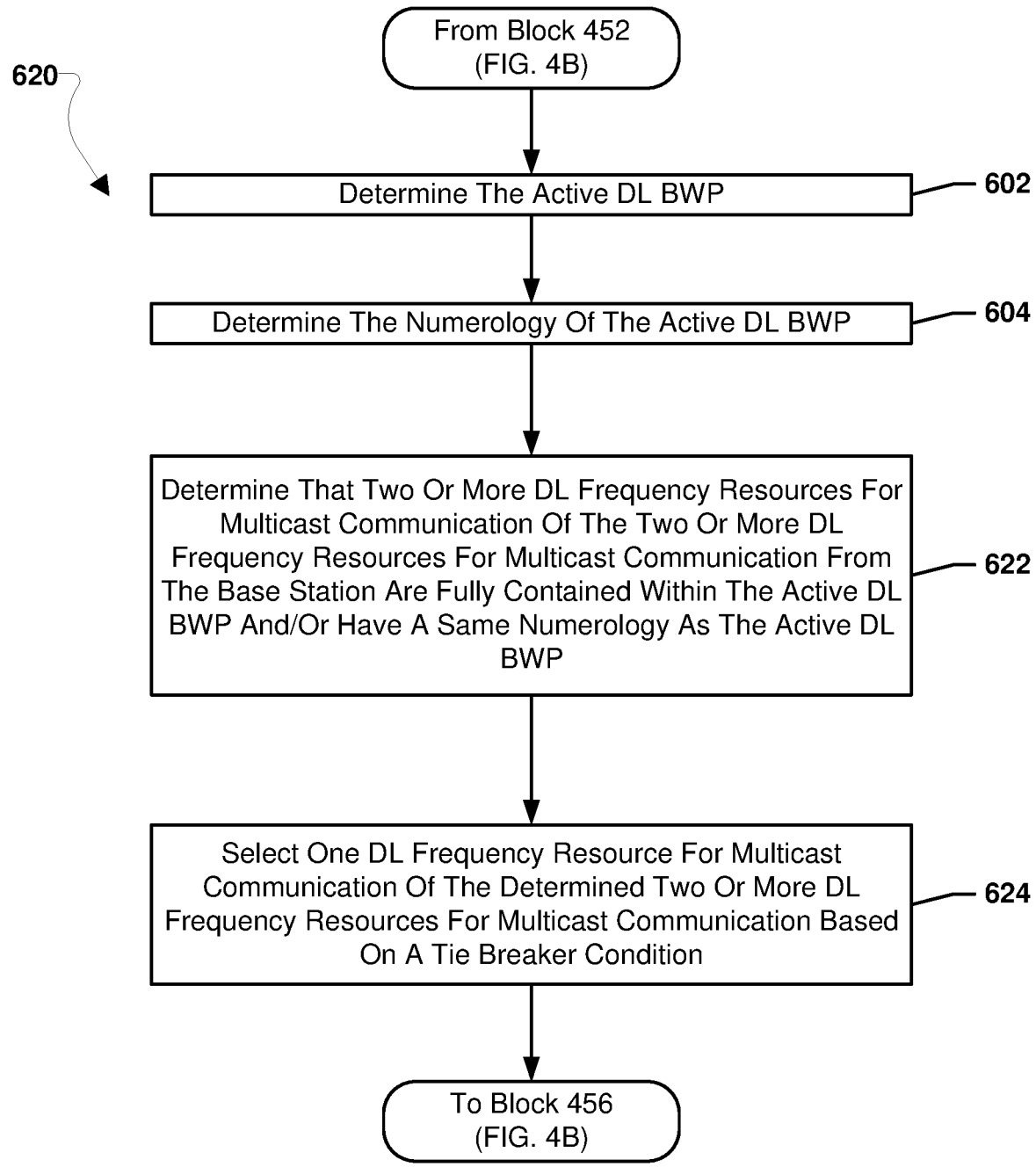
FIG. 6C is a process flow diagram illustrating a method for radio resource allocation to support multicast services in accordance with various embodiments.

FIG. 6C is a process flow diagram illustrating a method 620 for radio resource allocation to support multicast services in accordance with various embodiments. With reference to FIGS. 1-6C, the operations of the method 620 may be performed by a processor (such as the processor 210, 212, 214, 216, 218, 252, 260) of a wireless device (such as the wireless device 120*a*-120*e*, 200, 320). With reference to FIGS. 1-6C, means for performing each of the operations of the method 620 may be one or more processors of a wireless device (such as the wireless device 120*a*-120*e*, 200, 320), such as one or more of the processors 210, 212, 214, 216, 218, 252, 260. In some embodiments, the operations of the method 620 may be performed in conjunction with the operations of the method 450 (FIG. 4B). As a specific example, the operations of method 600 may be performed as part of the operations of block 454 of FIG. 4B to select the DL frequency resource for multicast communication of the two or more DL frequency resources for multicast communication from the base station to monitor for transmission of multicast data from the base station based at least in part on the active DL BWP.

In block 602, the processor may perform operations including determining the active DL BWP.

In block 604, the processor may perform operations including determining a numerology of the active DL BWP.

In block 622, the processor may perform operations including determining that two or more DL frequency resources for multicast communication of the two or more DL frequency resources for multicast communication from the base station are fully contained within the active DL BWP and/or have a same numerology as the active DL BWP.

In block 624, the processor may perform operations including selecting one DL frequency resource for multicast communication of the determined two or more DL frequency resources for multicast communication based on a tie breaker condition. In some embodiments, the tie breaker condition may be a lowest DL frequency resource for multicast communication identifier. In some embodiments, the tie breaker condition may be a wireless device setting of a preferred DL frequency resource for multicast communication.

Figure 7A:
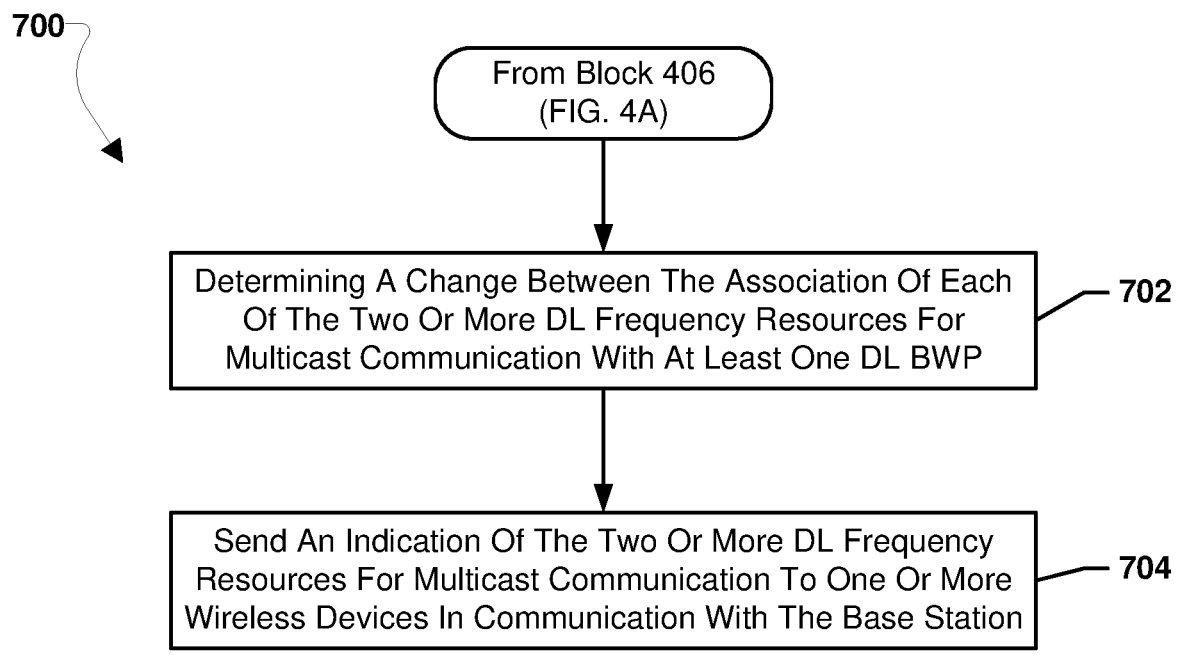
FIG. 7A is a process flow diagram illustrating a method for radio resource allocation to support multicast services in accordance with various embodiments.

FIG. 7A is a process flow diagram illustrating a method 700 for radio resource allocation to support multicast services in accordance with various embodiments. With reference to FIGS. 1-7A, the operations of method 700 may be implemented by a processor of a network computing device (e.g., the base station 110*a*-*d*, 350). With reference to FIGS. 1-7A, means for performing each of the operations of the method 700 may be one or more processors of a network computing device (e.g., the base station 110*a*-*d*, 350), such as one or more of the processors 210, 212, 214, 216, 218, 252, 260. In some embodiments, the operations of the method 700 may be performed in conjunction with the operations of the method 400 (FIG. 4A).

In block 702, the processor may perform operations including determining a change between the association of each of the two or more DL frequency resources for multicast communication with at least one DL BWP.

In block 704, the processor may perform operations including sending an indication of the change between the association of each of the two or more DL frequency resources for multicast communication with at least one DL BWP to one or more wireless devices in communication with the base station. In some embodiments, sending the indication of the change between the association of each of the two or more DL frequency resources for multicast communication with at least one DL BWP to one or more wireless devices in communication with the base station may include sending the indication of the change between the association of each of the two or more DL frequency resources for multicast communication with at least one DL BWP to one or more wireless devices in communication with the base station in down link control information (DCI) or a Media Access Control (MAC) Control Element (CE) message.

Figure 7B:
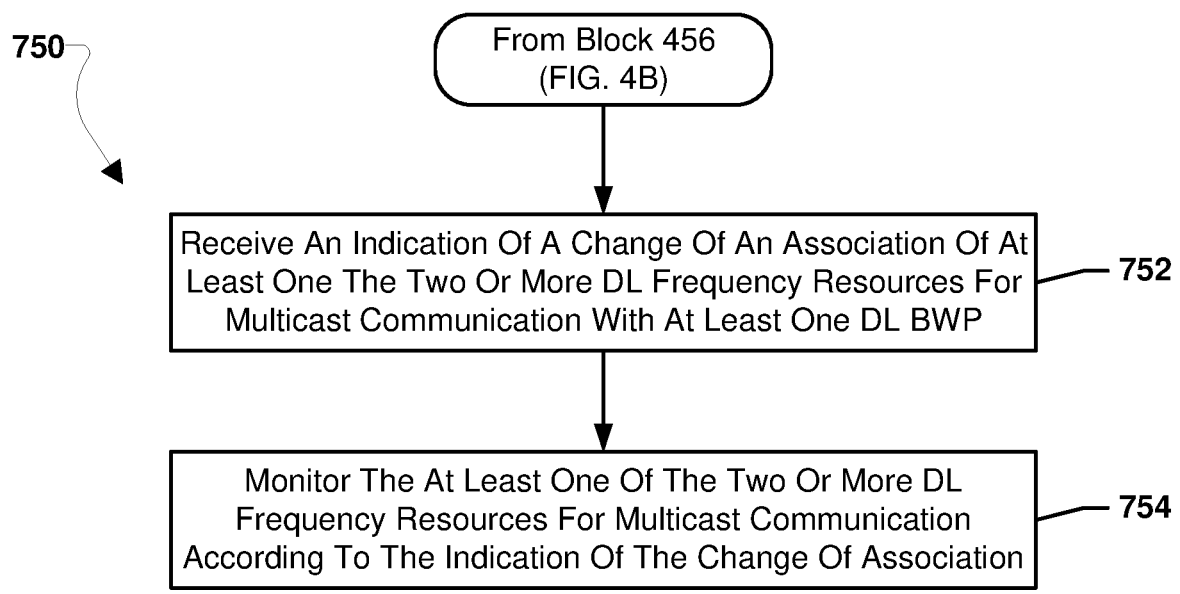
FIG. 7B is a process flow diagram illustrating a method for radio resource allocation to support multicast services in accordance with various embodiments.

FIG. 7B is a process flow diagram illustrating a method 750 for radio resource allocation to support multicast services in accordance with various embodiments. With reference to FIGS. 1-7B, the operations of the method 750 may be performed by a processor (such as the processor 210, 212, 214, 216, 218, 252, 260) of a wireless device (such as the wireless device 120*a*-120*e*, 200, 320). With reference to FIGS. 1-7B, means for performing each of the operations of the method 750 may be one or more processors of a wireless device (such as the wireless device 120a-120e, 200, 320), such as one or more of the processors 210, 212, 214, 216, 218, 252, 260. In some embodiments, the operations of the method 750 may be performed in conjunction with the operations of the method 450 (FIG. 4B), method 600 (FIG. 6A), and/or method 620 (FIG. 6C).

In block 752, the processor may perform operations including receiving an indication from the base station of the DL frequency resource for multicast communication of the two or more DL frequency resources for multicast communication from the base station to monitor in the active DL BWP. In some embodiments, the indication of the change of the association is received in down link control information (DCI) or a Media Access Control (MAC) Configuration Element (CE) message.

In block 754, the processor may perform operations including selecting the indicated DL frequency resource for multicast communication to monitor in the active DL BWP.

Figure 8A:
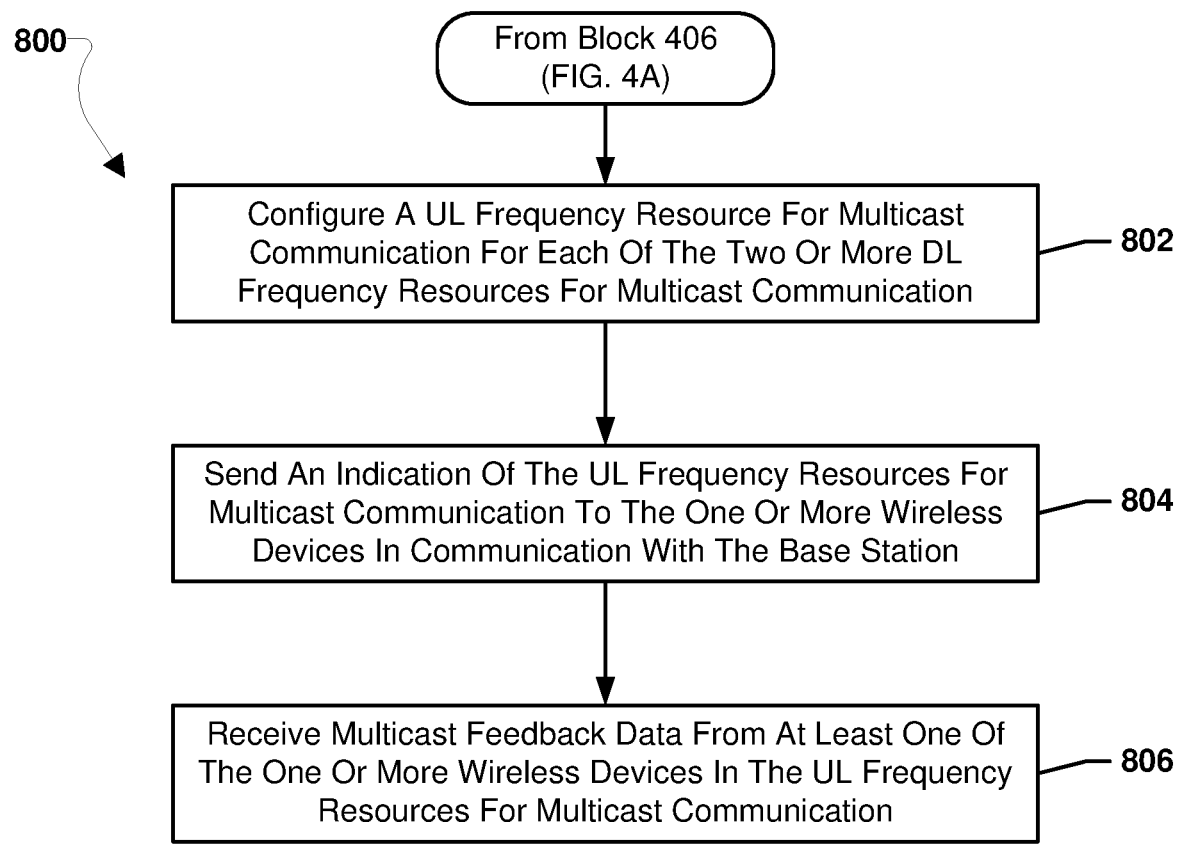
FIG. 8A is a process flow diagram illustrating a method for radio resource allocation to support multicast services in accordance with various embodiments.

FIG. 8A is a process flow diagram illustrating a method 800 for radio resource allocation to support multicast services in accordance with various embodiments. With reference to FIGS. 1-8A, the operations of method 800 may be implemented by a processor of a network computing device (e.g., the base station 110a-d, 350). With reference to FIGS. 1-8A, means for performing each of the operations of the method 800 may be one or more processors of a network computing device (e.g., the base station 110a-d, 350), such as one or more of the processors 210, 212, 214, 216, 218, 252, 260. In some embodiments, the operations of the method 800 may be performed in conjunction with the operations of the method 400 (FIG. 4A) and/or method 700 (FIG. 7A).

In block 802, the processor may perform operations including configuring an uplink (UL) frequency resource for multicast communication for each of the two or more DL frequency resources for multicast communication.

In block 804, the processor may perform operations including sending an indication of the UL frequency resources for multicast communication to the one or more wireless devices in communication with the base station. In some embodiments, the indication of the UL frequency resources for multicast communication may include an association of each of the UL frequency resources with its respective one of the two or more DL frequency resources for multicast communication.

In block 806, the processor may perform operations including receiving multicast feedback data from at least one of the one or more wireless devices in the UL frequency resources for multicast communication.

Figure 8B:
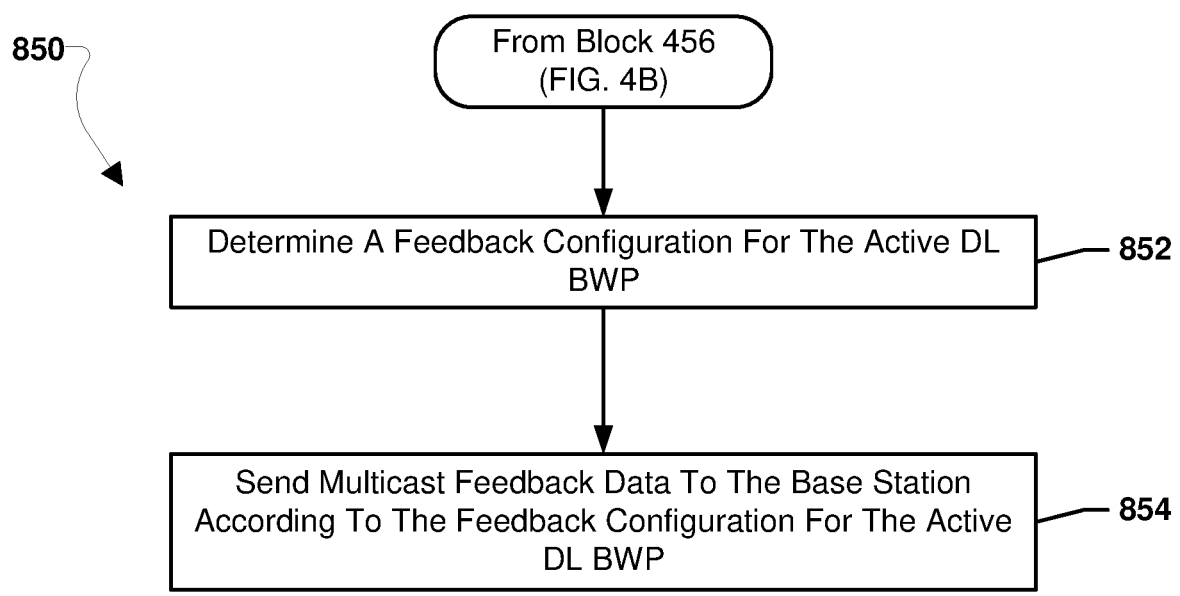
FIG. 8B is a process flow diagram illustrating a method for radio resource allocation to support multicast services in accordance with various embodiments.

FIG. 8B is a process flow diagram illustrating a method 850 for radio resource allocation to support multicast services in accordance with various embodiments. With reference to FIGS. 1-8B, the operations of the method 850 may be performed by a processor (such as the processor 210, 212, 214, 216, 218, 252, 260) of a wireless device (such as the wireless device 120a-120e, 200, 320). With reference to FIGS. 1-8B, means for performing each of the operations of the method 850 may be one or more processors of a wireless device (such as the wireless device 120a-120e, 200, 320), such as one or more of the processors 210, 212, 214, 216, 218, 252, 260. In some embodiments, the operations of the method 850 may be performed in conjunction with the operations of the method 450 (FIG. 4B), method 600 (FIG. 6A), method 620 (FIG. 6C), and/or method 750 (FIG. 7B).

In block 852, the processor may perform operations including determining a feedback configuration for the active DL BWP.

In block 854, the processor may perform operations including sending multicast feedback data to the base station according to the feedback configuration for the active DL BWP.

Figure 8C:
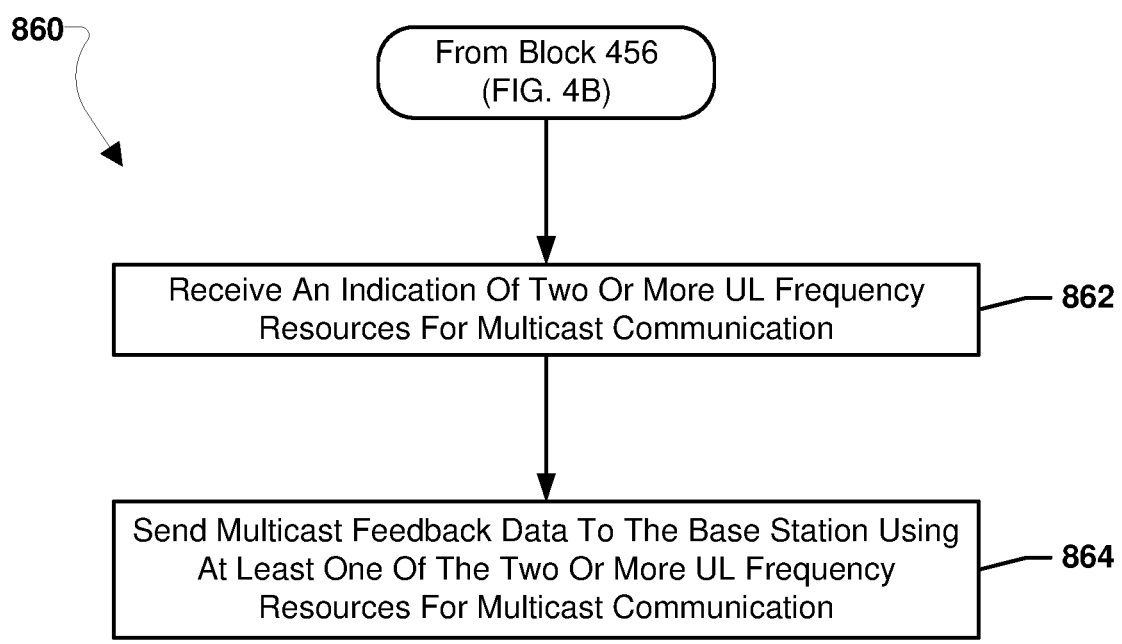
FIG. 8C is a process flow diagram illustrating a method for radio resource allocation to support multicast services in accordance with various embodiments.

FIG. 8C is a process flow diagram illustrating a method 860 for radio resource allocation to support multicast services in accordance with various embodiments. With reference to FIGS. 1-8B, the operations of the method 860 may be performed by a processor (such as the processor 210, 212, 214, 216, 218, 252, 260) of a wireless device (such as the wireless device 120a-120e, 200, 320). With reference to FIGS. 1-8C, means for performing each of the operations of the method 860 may be one or more processors of a wireless device (such as the wireless device 120a-120e, 200, 320), such as one or more of the processors 210, 212, 214, 216, 218, 252, 260. In some embodiments, the operations of the method 860 may be performed in conjunction with the operations of the method 450 (FIG. 4B), method 600 (FIG. 6A), method 620 (FIG. 6C), and/or method 750 (FIG. 7B).

In block 862, the processor may perform operations including receiving an indication of two or more uplink (UL) frequency resources for multicast communication. In some embodiments, the indication of the two or more UL frequency resources for multicast communication may associate each of the two or more UL frequency resources for multicast with one of the two or more DL frequency resources for multicast communication. In some embodiments, one of the two or more UL frequency resources for multicast is selected for use in sending the multicast feedback data to the base station based at least in part on the active DL BWP.

In block 864, the processor may perform operations including sending multicast feedback data to the base station using at least one of the two or more UL frequency resources for multicast communication.

Figure 9:
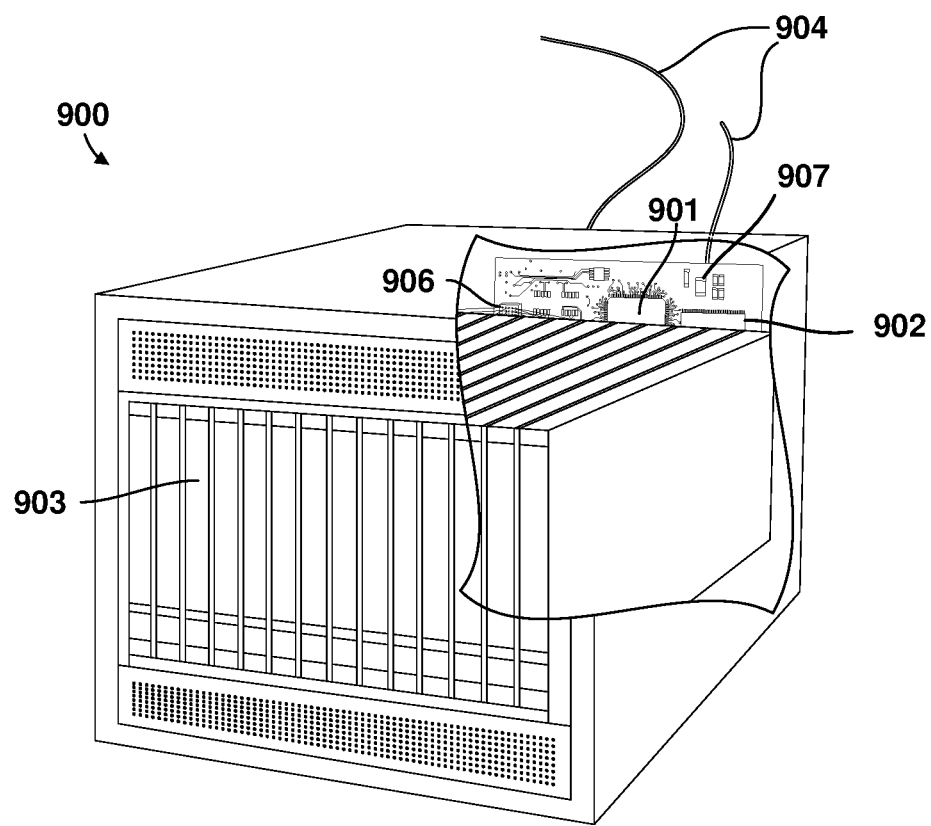
FIG. 9 is a component block diagram of a network computing device suitable for use with various embodiments.

FIG. 9 is a component block diagram of a network computing device 900, such as a base station (e.g., base station 110a-d, 350), suitable for use with various embodiments. Such network computing devices (e.g., base stations, such as gNBs, eNBs, etc.) may include at least the components illustrated in FIG. 9. With reference to FIGS. 1-9, the network computing device 900 may include a processor 901 coupled to volatile memory 902 and a large capacity non-volatile memory, such as a disk drive 903.

The network computing device 900 may also include a peripheral memory access device such as a floppy disc drive, compact disc (CD) or digital video disc (DVD) drive 906 coupled to the processor 901. The network computing device 900 may also include network access ports 904 (or interfaces) coupled to the processor 901 for establishing data connections with a network, such as the Internet and/or a local area network coupled to other system computers and servers.

The network computing device 900 may include one or more antennas 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

Figure 10:
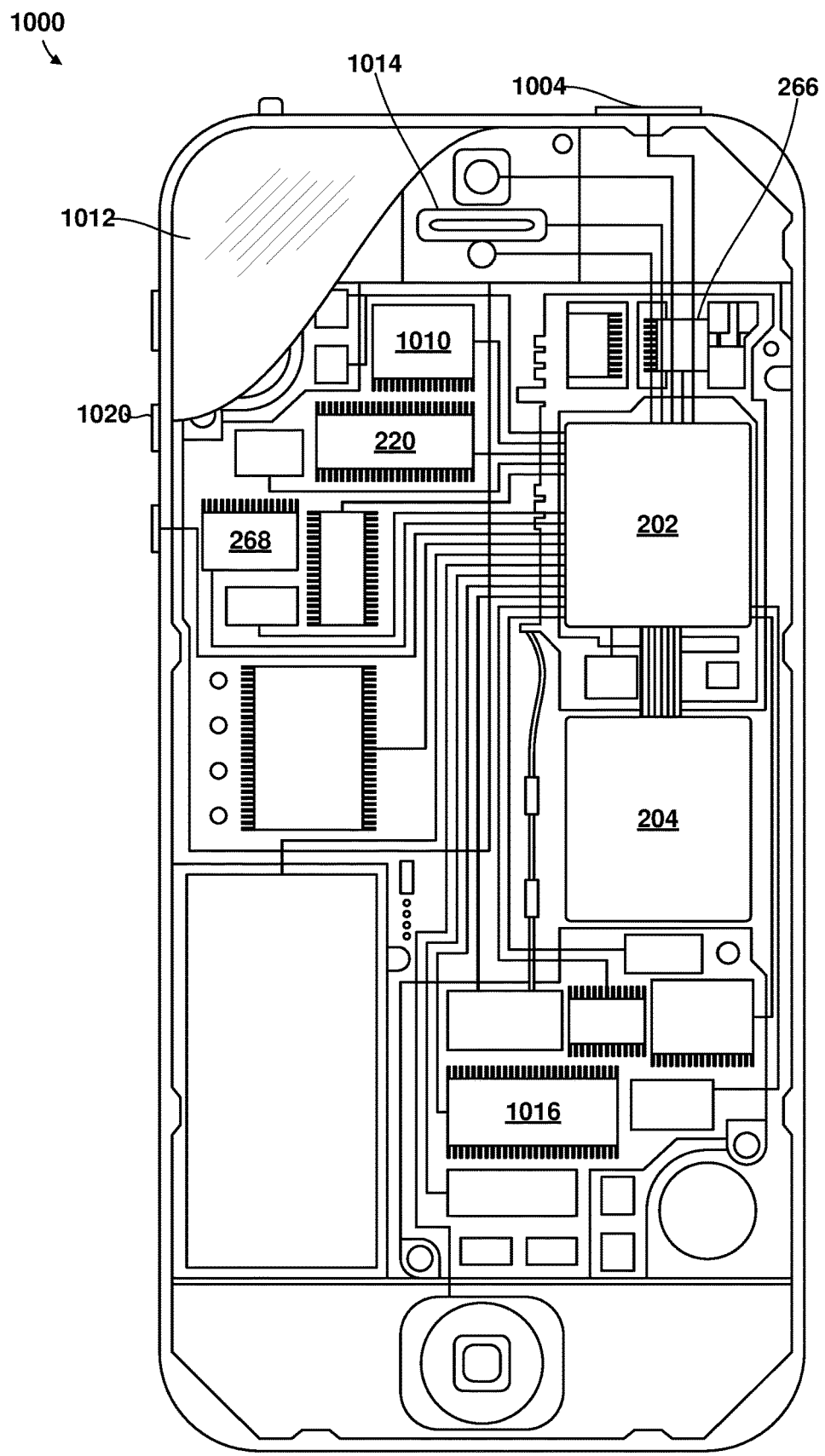
FIG. 10 is a component block diagram of a wireless device suitable for use with various embodiments.

FIG. 10 is a component block diagram of a wireless device 1000 suitable for use with various embodiments. With reference to FIGS. 1-10, various embodiments may be implemented on a variety of wireless devices 1000 (e.g., the wireless device 120a-120e, 200, 320), an example of which is illustrated in FIG. 10 in the form of a smartphone. The wireless device 1000 may include a first SOC 202 (e.g., a SOC-CPU) coupled to a second SOC 204 (e.g., a 5G capable SOC). The first and second SOCs 202, 204 may be coupled to internal memory 1016, a display 1012, and to a speaker 1014. The first and second SOCs 202, 204 may also be coupled to at least one SIM 268 and/or a SIM interface that may store information supporting a first subscription, such as a first 5G NR subscription, and a second subscription, such as a second 5G NR subscription, which may, for example, support service on a 5G non-standalone (NSA) network.

The wireless device 1000 may include an antenna 1004 for sending and receiving electromagnetic radiation that may be connected to a wireless transceiver 266 coupled to one or more processors in the first and/or second SOCs 202, 204. The wireless device 1000 may also include menu selection buttons or rocker switches 1020 for receiving user inputs.

The wireless device 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1010 may include a digital signal processor (DSP) circuit (not shown separately).

The processors of the wireless network computing device 700 and the wireless device 1000 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 220, 1016 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 450, 600, 620, 700, 750, 800, 850, and/or 860 may be substituted for or combined with one or more operations of the 400, 450, 600, 620, 700, 750, 800, 850, and/or 860.

Implementation examples of methods that may be implemented in a base station are described in the following paragraphs. While implementation examples 1-17 are described in terms of example methods, further example implementations described in the following paragraphs include the example methods implemented by a base station including a processor configured to perform operations of the example methods; the example methods implemented by a base station including means for performing functions of the example methods; and the example methods implemented as a non-transitory processor-readable storage medium having stored thereon processor-executable instructions configured to cause a processor of a base station to perform the operations of the example methods.

Example 1. A method for radio resource allocation to support multicast services performed by a processor of a base station (such as a Long Term Evolution (LTE) base station, a Fifth Generation (5G) New Radio (NR)(5G NR) base station, a later generation base station, etc.), including: configuring two or more downlink (DL) frequency resources for multicast communication within a carrier bandwidth; sending an indication of the two or more DL frequency resources for multicast communication to one or more wireless devices in communication with the base station; and scheduling transmission of multicast data in at least one of the two or more DL frequency resources for multicast communication.

Example 2. The method of example 1, in which configuring the two or more DL frequency resources for multicast communication within the carrier bandwidth includes: determining two or more DL band width parts (BWPs) configured within the carrier bandwidth; and configuring a DL frequency resource for multicast communication for each of the two or more DL BWPs configured within the carrier bandwidth.

Example 3. The method of example 1, in which at least one of the two or more DL frequency resources for multicast communication within the carrier bandwidth is associated with two or more DL BWPs configured within the carrier bandwidth.

Example 4. The method of example 1, in which the indication of the two or more DL frequency resources for multicast communication includes an indication of association of each of the two or more DL frequency resources for multicast communication with at least one DL BWP.

Example 5. The method of example 4, in which the indication of the association includes a pointer to the at least one DL BWP or an identifier of the at least one DL BWP.

Example 6. The method of example 4, further including: determining a change between the association of each of the two or more DL frequency resources for multicast communication with at least one DL BWP; and sending an indication of the change between the association of each of the two or more DL frequency resources for multicast communication with at least one DL BWP to one or more wireless devices in communication with the base station.

Example 7. The method of example 6, in which sending the indication of the change between the association of each of the two or more DL frequency resources for multicast communication with at least one DL BWP to one or more wireless devices in communication with the base station includes sending the indication of the change between the association of each of the two or more DL frequency resources for multicast communication with at least one DL BWP to one or more wireless devices in communication with the base station in down link control information (DCI) or a Media Access Control (MAC) Configuration Element (CE) message.

Example 8. The method of example 1, in which sending the indication of the two or more DL frequency resources for multicast communication to the one or more wireless devices in communication with the base station includes sending the indication of the two or more DL frequency resources for multicast communication to the one or more wireless devices in communication with the base station in a radio resource control (RRC) message.

Example 9. The method of example 1, further including: configuring an uplink (UL) frequency resource for multicast communication for each of the two or more DL frequency resources for multicast communication; sending an indication of the UL frequency resources for multicast communication to the one or more wireless devices in communication with the base station; and receiving multicast feedback data from at least one of the one or more wireless devices in the UL frequency resources for multicast communication.

Example 10. The method of example 9, in which the indication of the UL frequency resources for multicast communication includes an association of each of the UL frequency resources with its respective one of the two or more DL frequency resources for multicast communication.

Example 11. The method of example 1, in which the two or more DL frequency resources for multicast communication are two or more control resource sets (CORESETs) for multicast communication.

Example 12. The method of example 1, in which the two or more DL frequency resources for multicast communication are two or more bandwidth parts (BWPs) for multicast communication.

Example 13. The method of example 1, in which each of the two or more DL frequency resources for multicast communication are associated with different services.

Example 14. The method of example 13, in which the different services are associated with different group-radio network temporary identifiers (G-RNTI).

Example 15. The method of example 1, in which each of the two or more DL frequency resources for multicast communication have different configurations.

Example 16. The method of example 15, in which the different configurations are different search space sets or different physical channel configurations.

Example 17. The method of example 1, in which configuring the two or more DL frequency resources for multicast communication within the carrier bandwidth includes: determining two or more DL band width parts (BWPs) configured within the carrier bandwidth; and configuring a DL frequency resource for multicast communication for each of the two or more DL BWPs configured within the carrier bandwidth such that there is a one-to-one mapping between each DL frequency resource for multicast communication and each of the two or more DL BWPs configured within the carrier bandwidth.

Example 18. A base station, including a processor configured with processor-executable instructions to perform the operations recited in any of examples 1-17.

Example 19. A base station, including means for performing functions of the methods recited in any of examples 1-17.

Example 20. A non-transitory processor-readable storage medium having stored thereon processor-executable instructions configured to cause a processor of a base station to perform the operations recited in any of examples 1-17.

Implementation examples of methods that may be implemented in a wireless device are described in the following paragraphs. While implementation examples 1-17 are described in terms of example methods, further example implementations described in the following paragraphs include the example methods implemented by a wireless device including a processor configured to perform operations of the example methods; the example methods implemented by a wireless device including means for performing functions of the example methods; and the example methods implemented as a non-transitory processor-readable storage medium having stored thereon processor-executable instructions configured to cause a processor of a wireless device to perform the operations of the example methods.

Example 21. A method for radio resource allocation to receive a multicast service performed by a processor of a wireless device (such as a Long Term Evolution (LTE) wireless device, a Fifth Generation (5G) New Radio (NR) (5G NR) wireless device, a later generation wireless device, etc.), including: receiving an indication of two or more downlink (DL) frequency resources for multicast communication from a base station; selecting a DL frequency resource for multicast communication of the two or more DL frequency resources for multicast communication from the base station to monitor for transmission of multicast data from the base station based at least in part on an active DL bandwidth part (BWP); and monitoring the selected DL frequency resource for multicast communication for transmission of multicast data from the base station.

Example 22. The method of example 21, in which selecting the DL frequency resource for multicast communication of the two or more DL frequency resources for multicast communication from the base station to monitor for transmission of multicast data from the base station based at least in part on the active DL BWP includes: determining the active DL BWP; determining a numerology of the active DL BWP; and selecting the DL frequency resource for multicast communication of the two or more DL frequency resources for multicast communication from the base station to monitor for transmission of multicast data from the base station that is fully contained within the active DL BWP and/or has a same numerology as the active DL BWP.

Example 23. The method of example 21, in which selecting the DL frequency resource for multicast communication of the two or more DL frequency resources for multicast communication from the base station to monitor for transmission of multicast data from the base station based at least in part on the active DL BWP includes: determining the active DL BWP; determining a numerology of the active DL BWP; determining that two or more DL frequency resources for multicast communication of the two or more DL frequency resources for multicast communication from the base station are fully contained within the active DL BWP and/or have a same numerology as the active DL BWP; and selecting one DL frequency resource for multicast communication of the determined two or more DL frequency resources for multicast communication based on a tie breaker condition.

Example 24. The method of example 23, in which the tie breaker condition is a lowest DL frequency resource for multicast communication identifier.

Example 25. The method of example 23, in which the tie breaker condition is a wireless device setting of a preferred DL frequency resource for multicast communication.

Example 26. The method of example 21, in which receiving the indication of the two or more DL frequency resources for multicast communication from the base station includes receiving the indication of the two or more DL frequency resources for multicast communication from the base station in a unicast radio resource control (RRC) message.

Example 27. The method of example 21, in which receiving the indication of the two or more DL frequency resources for multicast communication from the base station includes receiving the indication of the two or more DL frequency resources for multicast communication from the base station in a multicast radio resource control (RRC) message.

Example 28. The method of example 27, in which selecting the DL frequency resource for multicast communication of the two or more DL frequency resources for multicast communication from the base station to monitor for transmission of multicast data from the base station based at least in part on the active DL BWP includes: receiving an indication from the base station of the DL frequency resource for multicast communication of the two or more DL frequency resources for multicast communication from the base station to monitor in the active DL BWP; and selecting the indicated DL frequency resource for multicast communication to monitor in the active DL BWP.

Example 29. The method of example 28, in which the indication from the base station of the DL frequency resource for multicast communication of the two or more DL frequency resources for multicast communication from the base station to monitor in the active DL BWP is received from the base station in a unicast RRC message.

Example 30. The method of example 21, the two or more DL frequency resources for multicast communication from the base station include: at least a first DL frequency resource for multicast communication from the base station associated with a multicast control channel; and at least a second DL frequency resource for multicast communication from the base station associated with a multicast traffic channel.

Example 31. The method of example 21, further including: receiving an indication of a change of an association of at least one of the two or more DL frequency resources for multicast communication with at least one DL BWP; and monitoring the at least one of the two or more DL frequency resources for multicast communication according to the indication of the change of association.

Example 32. The method of example 31, in which the indication of the change of the association is received in down link control information (DCI) or a Media Access Control (MAC) Configuration Element (CE) message.

Example 33. The method of example 21, further including: determining a feedback configuration for the active DL BWP; and sending multicast feedback data to the base station according to the feedback configuration for the active DL BWP.

Example 34. The method of example 21, further including: receiving an indication of two or more uplink (UL) frequency resources for multicast communication; and sending multicast feedback data to the base station using at least one of the two or more UL frequency resources for multicast communication.

Example 35. The method of example 34, in which the indication of the two or more UL frequency resources for multicast communication associates each of the two or more UL frequency resources for multicast with one of the two or more DL frequency resources for multicast communication.

Example 36. The method of example 34, in which one of the two or more UL frequency resources for multicast is selected for use in sending the multicast feedback data to the base station based at least in part on the active DL BWP Example 37. The method of example 21, in which the indication of the two or more DL frequency resources for multicast communication from the base station includes an indication of a feedback configuration to use for sending multicast feedback data to the base station.

Example 38. The method of example 21, in which each of the two or more DL frequency resources for multicast communication are associated with different services.

Example 39. The method of example 38, in which the different services are associated with different group-radio network temporary identifiers (G-RNTI).

Example 40. The method of example 21, in which the two or more DL frequency resources for multicast communication include a plurality of sets of two or more DL frequency resources for multicast communication and each of the plurality of sets is associated with a different service.

Example 41. The method of example 39, in which selecting the DL frequency resource for multicast communication of the two or more DL frequency resources for multicast communication from the base station to monitor for transmission of multicast data from the base station based at least in part on the active DL BWP includes selecting the DL frequency resource for multicast communication of the two or more DL frequency resources for multicast communication from the base station to monitor for transmission of multicast data from the base station based at least in part on the active DL BWP and a selection of one of the different services.

Example 42. The method of example 21, in which each of the two or more DL frequency resources for multicast communication have different configurations.

Example 43. The method of example 42, in which the different configurations are different search space sets or different physical channel configurations.

Example 44. The method of example 21, in which the two or more DL frequency resources for multicast communication are two or more control resource sets (CORESETs) for multicast communication.

Example 45. The method of example 21, in which the two or more DL frequency resources for multicast communication are two or more bandwidth parts (BWPs) for multicast communication.

Example 46. The method of example 21, in which the indication of the two or more DL frequency resources for multicast communication indicates a one-to-one mapping between each of the two or more DL frequency resources for multicast communication and a respective DL BWP configured within a carrier bandwidth.

Example 47. A wireless device, including a processor configured with processor-executable instructions to perform the operations recited in any of examples 21-46.

Example 48. A wireless device, including means for performing functions of the methods recited in any of examples 21-46.

Example 49. A non-transitory processor-readable storage medium having stored thereon processor-executable instructions configured to cause a processor of a wireless device to perform the operations recited in any of examples 21-46.

Example 50. A system, including: a wireless device, including a processor configured with processor-executable instructions to perform the operations recited in any of examples 21-46; and a base station, including a processor configured with processor-executable instructions to perform the operations recited in any of examples 1-17.

Example 51. A system, including: a wireless device, including means for performing functions of the methods recited in any of examples 21-46; and a base station, including means for performing functions of the methods recited in any of examples 1-17.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for radio resource allocation to receive a multicast service performed by a processor of a wireless device, comprising:

receiving an indication of two or more downlink (DL) frequency resources for multicast communication from a base station, wherein the indication of the two or more DL frequency resources for multicast communication indicates a one-to-one mapping between each of the two or more DL frequency resources for multicast communication and a respective DL BWP configured within a carrier bandwidth, wherein the two or more DL frequency resources for multicast communication comprise a plurality of sets of two or more DL frequency resources for multicast communication and each of the plurality of sets is associated with a different service;

selecting a DL frequency resource for multicast communication of the two or more DL frequency resources for multicast communication from the base station to monitor for transmission of multicast data from the base station based at least in part on an active DL bandwidth part (BWP); and monitoring the selected DL frequency resource for multicast communication for transmission of multicast data from the base station.

2. The method of claim 1, wherein selecting the DL frequency resource for multicast communication of the two or more DL frequency resources for multicast communication from the base station to monitor for transmission of multicast data from the base station based at least in part on the active DL BWP comprises:
determining the active DL BWP;
determining a numerology of the active DL BWP; and
selecting the DL frequency resource for multicast communication of the two or more DL frequency resources for multicast communication from the base station to monitor for transmission of multicast data from the base station that is fully contained within the active DL BWP and/or has a same numerology as the active DL BWP.

3. The method of claim 1, wherein receiving the indication of the two or more DL frequency resources for multicast communication from the base station comprises receiving the indication of the two or more DL frequency resources for multicast communication from the base station in a unicast radio resource control (RRC) message.

4. The method of claim 1, the two or more DL frequency resources for multicast communication from the base station comprise:
at least a first DL frequency resource for multicast communication from the base station associated with a multicast control channel; and
at least a second DL frequency resource for multicast communication from the base station associated with a multicast traffic channel.

5. The method of claim 1, further comprising:
determining a feedback configuration for the active DL BWP; and
sending multicast feedback data to the base station according to the feedback configuration for the active DL BWP.

6. The method of claim 1, further comprising:
receiving an indication of two or more uplink (UL) frequency resources for multicast communication; and
sending multicast feedback data to the base station using at least one of the two or more UL frequency resources for multicast communication.

7. The method of claim 6, wherein one of the two or more UL frequency resources for multicast is selected for use in sending the multicast feedback data to the base station based at least in part on the active DL BWP.

8. The method of claim 1, wherein selecting the DL frequency resource for multicast communication of the two or more DL frequency resources for multicast communication from the base station to monitor for transmission of multicast data from the base station based at least in part on the active DL BWP comprises selecting the DL frequency resource for multicast communication of the two or more DL frequency resources for multicast communication from the base station to monitor for transmission of multicast data from the base station based at least in part on the active DL BWP and a selection of one of the different services.

9. The method of claim 1, wherein each of the two or more DL frequency resources for multicast communication have different configurations and the different configurations are different search space sets or different physical channel configurations.

10. A method for radio resource allocation to support multicast services performed by a processor of a base station, comprising:
configuring two or more downlink (DL) frequency resources for multicast communication within a carrier bandwidth such that there is a one-to-one mapping between each DL frequency resource for multicast communication and each of the two or more DL BWPs configured within the carrier bandwidth;
sending an indication of the two or more DL frequency resources for multicast communication to one or more wireless devices in communication with the base station, wherein more than one of the two or more DL frequency resources are configured to be selected for multicast communication by each of the one or more wireless devices based at least in part on an active DL bandwidth part (BWP), wherein the indication of the two or more DL frequency resources for multicast communication indicates the one-to-one mapping between each of the two or more DL frequency resources for multicast communication and a respective DL BWP configured within a carrier bandwidth, wherein the two or more DL frequency resources for multicast communication comprise a plurality of sets of two or more DL frequency resources for multicast communication and each of the plurality of sets is associated with a different service; and
scheduling transmission of multicast data in at least one of the two or more DL frequency resources for multicast communication.

11. The method of claim 10, wherein configuring the two or more DL frequency resources for multicast communication within the carrier bandwidth comprises:
determining two or more DL BWPs configured within the carrier bandwidth; and
configuring a DL frequency resource for multicast communication for each of the two or more DL BWPs configured within the carrier bandwidth.

12. The method of claim 10, wherein sending the indication of the two or more DL frequency resources for multicast communication to the one or more wireless devices in communication with the base station comprises sending the indication of the two or more DL frequency resources for multicast communication to the one or more wireless devices in communication with the base station in a radio resource control (RRC) message.

13. The method of claim 10, further comprising:
configuring an uplink (UL) frequency resource for multicast communication for each of the two or more DL frequency resources for multicast communication;
sending an indication of the UL frequency resources for multicast communication to the one or more wireless devices in communication with the base station; and
receiving multicast feedback data from at least one of the one or more wireless devices in the UL frequency resources for multicast communication.

14. The method of claim 10, wherein the two or more DL frequency resources for multicast communication are two or more control resource sets (CORESETs) for multicast communication.

15. The method of claim 10, wherein each of the two or more DL frequency resources for multicast communication have different configurations that are different search space sets or different physical channel configurations.

16. A wireless device, comprising:
a processor configured with processor-executable instructions to perform operations comprising:
receiving an indication of two or more downlink (DL) frequency resources for multicast communication from a base station, wherein the indication of the two or more DL frequency resources for multicast communication indicates a one-to-one mapping between each of the two or more DL frequency resources for multicast communication and a respective DL BWP configured within a carrier bandwidth, wherein the two or more DL frequency resources for multicast communication comprise a plurality of sets of two or more DL frequency resources for multicast communication and each of the plurality of sets is associated with a different service;
selecting a DL frequency resource for multicast communication of the two or more DL frequency resources for multicast communication from the base station to monitor for transmission of multicast data from the base station based at least in part on an active DL bandwidth part (BWP); and
monitoring the selected DL frequency resource for multicast communication for transmission of multicast data from the base station.

17. The wireless device of claim 16, wherein the processor is configured with processor-executable instructions to perform operations such that selecting the DL frequency resource for multicast communication of the two or more DL frequency resources for multicast communication from the base station to monitor for transmission of multicast data from the base station based at least in part on the active DL BWP comprises:
determining the active DL BWP;
determining a numerology of the active DL BWP; and
selecting the DL frequency resource for multicast communication of the two or more DL frequency resources for multicast communication from the base station to monitor for transmission of multicast data from the base station that is fully contained within the active DL BWP and/or has a same numerology as the active DL BWP.

18. The wireless device of claim 16, wherein the processor is configured with processor-executable instructions to perform operations such that receiving the indication of the two or more DL frequency resources for multicast communication from the base station comprises receiving the indication of the two or more DL frequency resources for multicast communication from the base station in a unicast radio resource control (RRC) message.

19. The wireless device of claim 16, wherein the processor is configured with processor-executable instructions to perform operations such that the two or more DL frequency resources for multicast communication from the base station comprise:
at least a first DL frequency resource for multicast communication from the base station associated with a multicast control channel; and
at least a second DL frequency resource for multicast communication from the base station associated with a multicast traffic channel.

20. The wireless device of claim 16, wherein the processor is configured with processor-executable instructions to perform operations further comprising:
determining a feedback configuration for the active DL BWP; and
sending multicast feedback data to the base station according to the feedback configuration for the active DL BWP.

21. The wireless device of claim 16, wherein the processor is configured with processor-executable instructions to perform operations further comprising:
receiving an indication of two or more uplink (UL) frequency resources for multicast communication; and
sending multicast feedback data to the base station using at least one of the two or more UL frequency resources for multicast communication.

22. A base station, comprising:
a processor configured with processor-executable instructions to perform operations comprising:
configuring two or more downlink (DL) frequency resources for multicast communication within a carrier bandwidth such that there is a one-to-one mapping between each DL frequency resource for multicast communication and each of the two or more DL BWPs configured within the carrier bandwidth;
sending an indication of the two or more DL frequency resources for multicast communication to one or more wireless devices in communication with the base station, wherein more than one of the two or more DL frequency resources are configured to be selected for multicast communication by each of the one or more wireless devices based at least in part on an active DL bandwidth part (BWP), wherein the indication of the two or more DL frequency resources for multicast communication indicates the one-to-one mapping between each of the two or more DL frequency resources for multicast communication and a respective DL BWP configured within a carrier bandwidth, wherein the two or more DL frequency resources for multicast communication comprise a plurality of sets of two or more DL frequency resources for multicast communication and each of the plurality of sets is associated with a different service; and
scheduling transmission of multicast data in at least one of the two or more DL frequency resources for multicast communication.

23. The base station of claim 22, wherein the processor is configured with processor-executable instructions to perform operations such that configuring the two or more DL frequency resources for multicast communication within the carrier bandwidth comprises:
determining two or more DL BWPs configured within the carrier bandwidth; and configuring a DL frequency resource for multicast communication for each of the two or more DL BWPs configured within the carrier bandwidth.

24. The base station of claim 22, wherein the processor is configured with processor-executable instructions to perform operations such that sending the indication of the two or more DL frequency resources for multicast communication to the one or more wireless devices in communication with the base station comprises sending the indication of the two or more DL frequency resources for multicast communication to the one or more wireless devices in communication with the base station in a radio resource control (RRC) message.

25. The base station of claim 22, wherein the processor is configured with processor-executable instructions to perform operations further comprising:
- configuring an uplink (UL) frequency resource for multicast communication for each of the two or more DL frequency resources for multicast communication;
- sending an indication of the UL frequency resources for multicast communication to the one or more wireless devices in communication with the base station; and
- receiving multicast feedback data from at least one of the one or more wireless devices in the UL frequency resources for multicast communication.

* * * * *